(12) United States Patent
Gupta et al.

(10) Patent No.: US 12,112,752 B1
(45) Date of Patent: Oct. 8, 2024

(54) COHORT DETERMINATION IN NATURAL LANGUAGE PROCESSING

(71) Applicant: Amazon Technologies, Inc., Seattle, WA (US)

(72) Inventors: Rahul Gupta, Waltham, MA (US); Jwala Dhamala, Sunnyvale, CA (US); Apurv Verma, Up (IN); Qingwen Ye, Boston, MA (US); Mayur Himmatbhai Dabhi, Medford, MA (US); Srinivasan Rengarajan Veeravanallur, Sharon, MA (US); Spyridon Matsoukas, Hopkinton, MA (US); Melanie C B Gens, Honolulu, HI (US); Seyed Omid Razavi, Austin, TX (US); Avni Khatri, Stow, MA (US); Premkumar Natarajan, Rolling Hills Estates, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 410 days.

(21) Appl. No.: 17/688,279

(22) Filed: Mar. 7, 2022

(51) Int. Cl.
| | |
|---|---|
| G10L 15/22 | (2006.01) |
| G10L 15/01 | (2013.01) |
| G10L 15/06 | (2013.01) |
| G10L 15/08 | (2006.01) |

(52) U.S. Cl.
CPC .............. *G10L 15/22* (2013.01); *G10L 15/01* (2013.01); *G10L 15/063* (2013.01); *G10L 15/08* (2013.01); *G10L 2015/0631* (2013.01); *G10L 2015/223* (2013.01)

(58) Field of Classification Search
CPC ....... G10L 15/22; G10L 15/01; G10L 15/063; G10L 15/08; G10L 2015/0631; G10L 2015/223
USPC ...................................................... 704/9, 231
See application file for complete search history.

(56) References Cited

U.S. PATENT DOCUMENTS 10,366,161 B2 * 7/2019 Allen .................. G06F 16/3344

* cited by examiner

*Primary Examiner* — George C Monikang
(74) *Attorney, Agent, or Firm* — K&L Gates LLP

(57) ABSTRACT

Devices and techniques are generally described for cohort determination in natural language processing. In various examples, a first natural language input to a natural language processing system may be determined. The first natural language input may be associated with a first account identifier. A first machine learning model may determine first data representing one or more words of the first natural language input. A second machine learning model may determine second data representing one or more acoustic characteristics of the first natural language input. Third data may be determined, the third data including a predicted performance for processing the first natural language input by the natural language processing system. The third data may be determined based on the first data representation and the second data representation.

20 Claims, 8 Drawing Sheets

COHORT DETERMINATION IN NATURAL LANGUAGE PROCESSING

BACKGROUND

People can interact with computing devices using spoken commands. In some systems, a "wakeword" is used to activate functionality. Natural language processing is used to transform the spoken requests that follow into a computer directive for performing a task.

DETAILED DESCRIPTION

Figure 1A:
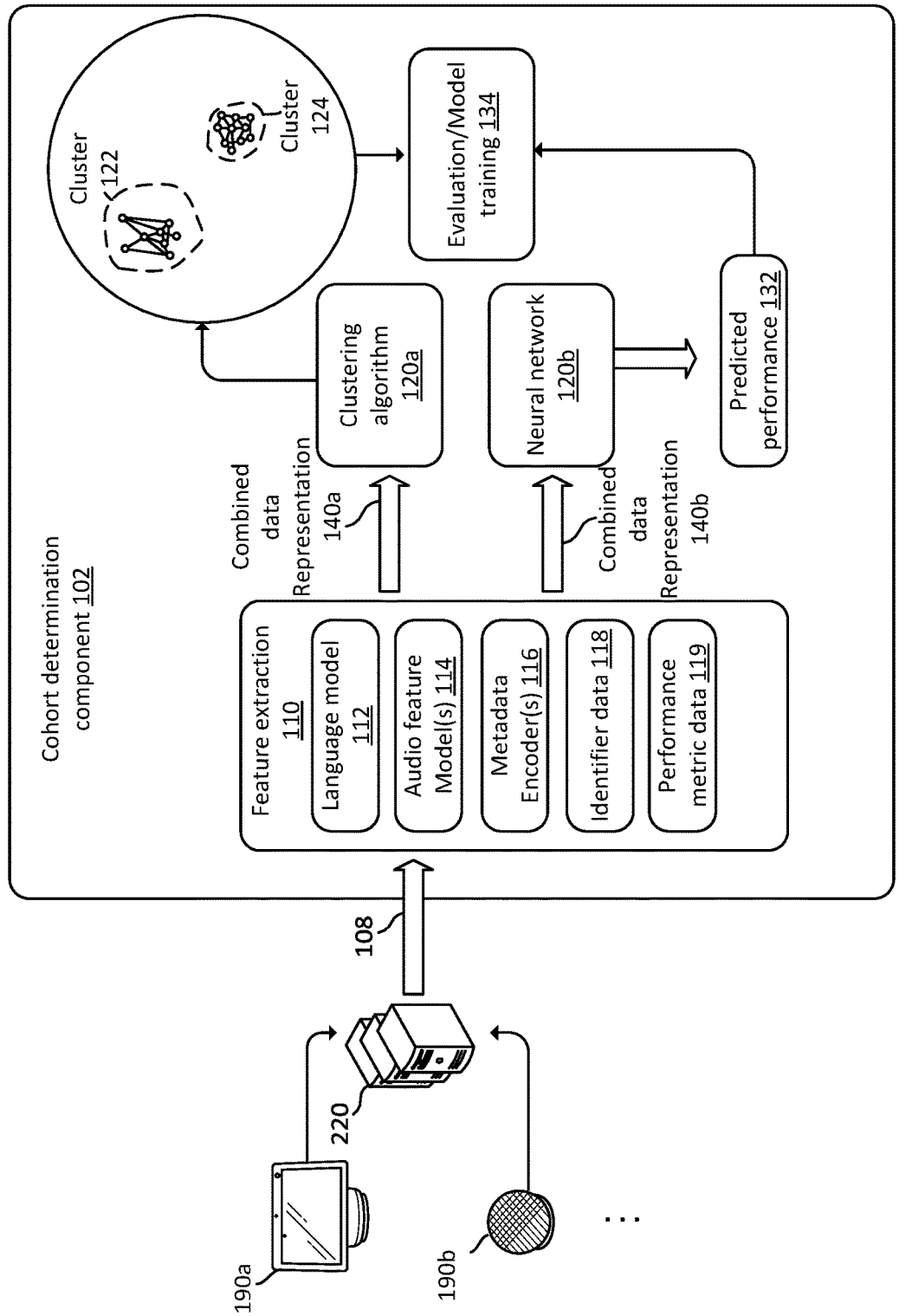
FIG. 1A is a block diagram illustrating a cohort determination component used in natural language processing, in accordance with various aspects of the present disclosure.

In the following description, reference is made to the accompanying drawings that illustrate several examples of the present invention. It is understood that other examples may be utilized and various operational changes may be made without departing from the scope of the present disclosure. The following detailed description is not to be taken in a limiting sense, and the scope of the embodiments of the present invention is defined only by the claims of the issued patent.

Machine learning techniques are often used to form predictions, solve problems, recognize objects in image data for classification, etc. For example, machine learning techniques may be used to detect objects represented in image data, translate text from one spoken language to another, determine semantic interpretations of speech, etc. In various examples, machine learning models may perform better than rule-based systems and may be more adaptable as machine learning models may be improved over time by retraining the models as more and more data becomes available. Accordingly, machine learning techniques are often adaptive to changing conditions. Deep learning algorithms, such as neural networks, are often used to detect patterns in data and/or perform tasks.

In some cases, artificial intelligence algorithms, such as machine learning models, may perform better is some scenarios and/or for some inputs relative to others. For example, supervised machine learning classifiers (e.g., classifier models) may be better able to classify instances that are similar to instances of known classes present in the training data (e.g., training instances). In some cases, the performance of artificial intelligence algorithms, such as machine learning models, may suffer for certain classes when such classes are not sufficiently represented in the training data. For example, an object detection computer vision algorithm that has been trained to detect obstacles may have difficulty detecting animals or plants when such classes are not sufficiently well represented in the training data corpus.

In a natural language understanding context, machine learning models may be trained to determine representations of various aspects and/or characteristics of natural language inputs.

For example, machine learning models may generate text transcriptions (or other representations), semantic interpretations, entity recognition, etc. for input human speech (or text). In various examples, such models may be less accurate in recognizing inputs that have characteristics not sufficiently represented in the training data. For example, if the training data consists mostly of recordings of speech from a particular region and/or demographic, and/or speech having similar acoustic characteristics, the resulting model may be less accurate when the input speech has characteristics underrepresented in the training data. In some cases, due to the multivariate nature of the data representing different types of inputs, it may be difficult to ascertain which types of data may be underrepresented in the training data.

Described herein are systems and techniques that may be used to determine different cohorts describing characteristics of input data. The cohorts may represent similar inputs and/or inputs which experience similar levels of performance (according to one or more selected performance level metrics). In the context of natural language processing, determining different cohorts may be used to improve the performance of the various machine learning models used in a natural language processing system so that the models perform well for any type of input. In various examples, the cohorts may be used to determine underserved cohorts of inputs (based on an aggregated performance level of the cohort). Data points included in underserved cohorts may be included in training data sets to improve model performance after retraining. Similarly, the cohort determination component may allow features that have the greatest impact on performance to be determined (e.g., by training a classification model based on such features). In various examples, a cohort determination component may be trained and used to perform inference on live traffic (e.g., input audio data the system has yet to generate a final response to), so that any given input may be grouped into a particular cohort. In various cases, routing decisions for the input may be made based on the predicted cohort. For example, inputs may be routed to models that exhibit better performance for the predicted cohort. As described in further detail below, unsupervised machine learning algorithms may be used to determine the various cohorts and to train the cohort determination component. However, in some other implementations, supervised machine learning techniques (e.g., a neural network, etc.) may be used to classify incoming inputs according to a predicted performance level and/or a predicted cohort. In various examples, cohorts of similar natural language requests are modeled based on implicit data from the natural language inputs themselves rather than from explicit labeling data that identifies the natural language inputs as pertaining to a particular group, demographic, and/or class. This may be beneficial as such explicit labeling data may be, in some cases, of a sensitive nature.

Generally, in machine learned models, such as neural networks, parameters control activation values in neurons within layers of the machine learned models. The weighted sum of activation values of each neuron in a preceding layer may be input to an activation function (e.g., a sigmoid function, a rectified linear units (ReLU) function, etc.). The result determines the activation value of a neuron in a subsequent layer. In addition, a bias value can be used to shift the output of the activation function by adding to or subtracting from the activation value, and thus may bias a neuron toward activation (or inactivation).

Generally, in machine learning models, such as neural networks, after initialization, annotated training data may be used to generate a cost or "loss" function that describes the difference between expected output of the machine learning model and actual output. The parameters (e.g., weights and/or biases) of the machine learning model may be updated to minimize the cost. For example, the machine learning model may use a gradient descent algorithm to incrementally adjust the weights to cause the most rapid decrease to the output of the loss function. The method of updating the parameters of the machine learning model is often referred to as back propagation.

Automatic speech recognition (ASR) is a field of computer science, artificial intelligence, and linguistics concerned with transforming audio data associated with speech into text data and/or other ASR output data representative of that speech. Natural language understanding (NLU) is a field of computer science, artificial intelligence, and linguistics concerned with enabling computers to derive meaning from text input containing natural language, resulting in specific executable command data or other type of instructions. As described in further detail below, in some examples, NLU processing may include multiple different processes that may be executed for a given natural language input in order to determine a semantic interpretation of the natural language input. Natural language generation (NLG) is a computer-based process that may be used to produce natural language output. Text-to-speech (TTS) is a field of computer science, artificial intelligence, and linguistics concerned with enabling computers to output synthesized speech. ASR, NLU, NLG, and TTS may be used together as part of a natural language processing system. Natural language input data may comprise audio data (e.g., representing a user request or command), text data, and/or other representation data representing natural language for input into a natural language processing system.

As used herein, user utterances, input text data, and/or any form of data input to a natural language processing system ("input data") may be described by "request data" and/or "user request data." Such request data may change forms many times during processing of the request data by various components of the speech processing system. For example, initially the request data may be audio data and/or input text data representing a user question. The audio data may be transformed into text data and/or other type of ASR output data by an ASR component of the speech processing system. The ASR output data may be transformed into intent data by an NLU component of the speech processing system, which represents the semantic meaning of the natural language input. The intent data may be used by a speech processing application (e.g., a skill) to determine an action (e.g., to generate action data, such as initiating NLG and/or TTS processing to use synthetic speech to answer a user's question, play video, play audio, turn ON/OFF a light, tune a TV/radio, adjust temperature of thermostat, send a message, etc.). "Request data" and/or "user request data" may refer to any data related to an input request to a speech processing system (e.g., including the various data forms described above, as each of the aforementioned data types relate to an input request to the speech processing system). In general, as used herein, natural language processing "applications" may be any software (and/or combination of software and hardware) used during and/or after natural language processing to take an action in response to input request data (e.g., natural language inputs such as user utterances and/or text). Such applications may include speech processing skills and/or other types of speech processing software.

The various techniques described herein may be used in a variety of contexts, including in natural language processing enabled devices (e.g., devices employing voice control and/or speech processing "voice assistants") and/or systems. Examples of speech processing systems and/or voice-enabled personal assistants include the Siri system from Apple Inc. of Cupertino, California, voice-enabled actions invoked by the Google Assistant system from Google LLC of Mountain View, California, Dragon speech recognition software and the Cortana system from Microsoft Corporation of Redmond, Washington, the Alexa system from Amazon.com, Inc. of Seattle, Washington, etc. The various natural language processing techniques described herein may be executed on any type of computing device. Some example natural language processing enabled devices may include mobile devices (e.g., on a user's phone, laptop, etc.), smart speakers, embedded systems (e.g., smart lights, smart appliances), vehicle computing systems, desktop devices, etc.

Natural language processing enabled devices may include one or more microphones (e.g., far-field microphone arrays) used to transform audio into electrical signals. Speech processing may then be performed, either locally by the speech processing enabled device, by one or more other computing devices communicating with the speech processing enabled device over a network, or by some combination of the natural language processing enabled device and the one or more other computing devices. In various examples, natural language processing enabled devices may include and/or may be configured in communication with speakers and/or displays effective to output information obtained in response to a user's spoken request or command, and/or to output content that may be of interest to one or more users.

Storage and/or use of data related to a particular person or device (e.g., device names, names of device groups, contextual data, and/or any personal data) may be controlled by a user using privacy controls associated with a speech processing enabled device and/or a companion application associated with a speech processing enabled device. Users may opt out of storage of personal, device state (e.g., a paused playback state, etc.), and/or contextual data and/or may select particular types of personal, device state, and/or contextual data that may be stored while preventing aggregation and storage of other types of personal, device state, and/or contextual data. Additionally, aggregation, storage, and use of personal, device state, and/or contextual information, as described herein, may be compliant with privacy controls, even if not legally subject to them. For example, personal, contextual, device state, and other data described herein may be treated as if it was subject to acts and regulations, such as the Health Insurance Portability and Accountability Act (HIPAA) and the General Data Protection Regulation (GDPR), even if it is not actually subject to these acts and regulations. In various examples, the device and/or device group names and/or any data captured by such devices may be used only in accordance with user permission, in compliance with any relevant laws and/or policies. Additionally, users may opt out of data collection, and/or may opt to delete some or all of the data used by the various techniques described herein, even where deletion or non-collection of various data may result in reduced functionality and/or performance of various aspects of the systems described herein.

In various examples, a natural language processing enabled device may include a wakeword detection component. The wakeword detection component may process audio data captured by microphones of the speech processing enabled device and may determine whether or not a wakeword (e.g., a predetermined keyword, multi-word phrase, non-spoken audio event, etc.) is detected in the audio data. When a wakeword is detected, the speech processing enabled device may enter a "sending mode" in which audio detected by the microphones following the wakeword (e.g., data representing user request data spoken after the wakeword) may be sent to natural language processing computing component(s) (either locally or remotely) for further natural language processing (e.g., ASR, NLU, etc.). In various examples, the wakeword detection component may be used to distinguish between audio that is intended for the natural language processing system and audio that is not intended for the natural language processing system.

FIG. 1A is a block diagram illustrating a cohort determination component 102 used in natural language processing, in accordance with various aspects of the present disclosure. Various components of FIG. 1A may be further described below in reference to various other figures. In various examples, a device 190a, 190b, etc., may receive a natural language input comprising a request to perform some action. For example, the natural language request may be a spoken request (or a text request) to play music, play video, answer a question, control a device, and/or take some other action. Devices 190a, 190b, etc., may be examples of natural language processing enabled devices. Devices 190a, 190b, etc., may include one or more microphones and may listen for a wakeword. Upon detection of the wakeword, the devices 190a, 190b, etc., may capture audio data representing the natural language input (e.g., a spoken input) for further natural language processing (including ASR processing, NLU processing, etc.). In various examples, audio data representing the audio captured after the wakeword may be sent to a natural language processing system 220 for natural language processing. However, in some other examples, the natural language processing system 220 may be implemented, wholly or in part, on devices 190a and/or 190b, depending on the implementation.

Natural language processing system 220 (whether implemented by device(s) 190a, 190b, or separately implemented) may send data 108 to cohort determination component 102. The data 108 may represent the audio captured following the wakeword, text data or other data representing the natural language input (e.g., ASR output data), data representing a semantic interpretation of the natural language input (e.g., NLU output data), metadata such as geographic location data associated with devices 190a, 190b, and/or associated with an account identifier registered with devices 190a, 190b, etc., session identifier data identifying a particular natural language processing session (e.g., an identifier referencing a particular dialog between a user and the natural language processing system), a person identifier identifying a particular individual that has registered with the natural language processing system (and who has consented to having identifier data representing them be gathered and used by the natural language processing system to customize performance), etc.

In some further examples, data 108 may include performance metric data that indicates a performance of various components of the natural language processing system 220. Performance metric data 119 may include error rates and/or performance scores output by machine learning models of the natural language processing system 220. Some examples may include a customer perceived defect rate (CPDR), a word error rate (WER), NLU error rate, data representing user friction in dialog, etc. In various examples, CPDR may be output by a machine learning model trained to predict whether or not a user perceives the output and/or interpretation for a given user natural language input as being defective. In some examples, CPDR may be a supervised machine learning model trained using historical natural language inputs determined during past time periods. WER may be an output score of one or more ASR machine learning models used to determine text and/or other representation data that represents the words spoken by the user in a speech input. WER may represent the likelihood of transcription error and may be generated per word (e.g., per token) or per input phrase. NLU error rate may represent error in the semantic interpretation of a given user input and may be output by one or more NLU machine learning models. Friction models may detect user friction resulting from the user expressing negative intents in response to an action taken by the natural language processing system. For example, a user saying "No . . . ," "Stop," and/or other corrective statements may represent user friction. In some cases, friction may be represented using a numerical score (e.g., output by a friction detection classifier or similar model). The various performance metric data included in data 108 may be associated with the particular session identifier, user identifier (e.g., account identifier) of the natural language input. Accordingly, the input data may be partitioned according to different identifier data (e.g., session identifier, user identifier (e.g., account identifier), person identifier, etc.) in order to form the different cohorts of user inputs according to the desired implementation.

Data 108 may be sent to feature extraction 110. Feature extraction 110 may process the input data 108 to generate various features that may be used to represent the natural language inputs. Various machine learning models and/or processing techniques may be used to generate features representing data 108 (and the natural language input). The particular feature encoders vary depending on the desired implementation. In general, some feature encoders may represent the natural language input itself (e.g., to generate vector representations of the language styles (e.g., politeness, formality, etc.), the syntax, vernacular, vocabulary, etc., while other feature encoders may represent acoustic characteristics of spoken user inputs (e.g., pitch, frequency, energy band representations, etc.) In various examples, language model 112 may represent a machine learning-based language model (e.g., Bidirectional Encoder Representations in Transformers (BERT), and/or another transformer-based language model, a long short term memory (LSTM) model (or other recurrent neural network), etc.). The language model 112 may have various classifier heads that may numerically encode the tokens, the language styles (e.g., politeness, formality, etc.), the syntax, vernacular, vocabulary, etc. For example, the average BERT embeddings may be computed over the selected identifier data 118 (e.g., account identifier, device identifier, etc.).

Similarly, audio feature model(s) 114 may encode acoustic characteristics of user speech (for the given natural language input) using one or more acoustic models. For example, the audio feature model(s) 114 may include a Kaldi feature extractor that may generate mel-frequency cepstral coefficients (MFCC) representing the short-term power spectrum of the user speech (generated using a linear cosine transform of the log power spectrum of the speech on a nonlinear mel scale of frequency). In another example, the audio feature model(s) 114 may include a Praat-based acoustic feature extractor representing such characteristics as spectral analysis (e.g., spectrograms), pitch analysis, intensity analysis, jitter, excitation patterns, etc.

Metadata encoder(s) 116 may encode metadata such as geographic data associated with the device, account identifier data, session identifier data, device identifier data, etc. In various examples, one hot encoding and/or other numerical encoding schemes may be used to numerically represent such information. As previously described, identifier data 118 may include account identifier data, session identifier data, device identifier data, etc. The identifier data 118 may be used directly (as it may be a numerical identifier) or may be encoding, depending on the particular implementation.

In various examples, the various features determined by feature extraction 110 and described above may be used to represent the natural language input and/or the speaker of the natural language input (in cases where the natural language input is a spoken request). The features may be combined (e.g., concatenated, added using vector addition, etc.) to generate combined data representation 140*a*, 140*b* (e.g., combined feature vectors). In some examples, an unsupervised machine learning model may be trained using a plurality of such combined data representations 140*a* (e.g., for a large number of natural language inputs). For example, the unsupervised machine learning model may be trained using a clustering algorithm 120*a*. The clustering algorithm 120*a* may support clustering representations of data points (e.g., the combined data representations 140*a* for each natural language input) at the desired granularity (e.g., at the account identifier level, the session identifier level, the person identifier level, the device identifier level, etc.). The clustering algorithm may cluster similar data points (e.g., data points having similar combined data representations 140*a*) together into clusters (e.g., clusters 122, 124). Depending on the clustering algorithm used, the clustering algorithm may form clusters based on the distance between the different feature representations in the common feature space.

In various examples, three different loss functions may be used by the clustering algorithm 120*a*: 1) a feature representation homogeneity loss; 2) a performance metric homogeneity loss; and 3) an attribute heterogeneity loss.

The goal of the feature representation homogeneity loss is to maximize the homogeneity of feature representations (e.g., the combined data representations 140*a*) within a given cluster (e.g., cluster 122, cluster 124, etc.). This can be achieved using clustering loss functions that minimize intercluster variance such as those used by K-Means, spectral clustering, DBSCAN (or other examples of clustering algorithms 120*a*), or by training generative models like a variational autoencoder (VAE) that obtain clusters in the latent generative distributions of the combined data representations 140*a*.

The goal of the performance metric homogeneity loss is to encourage clustering such that selected identifier data 118 units carry similar performance metric values. In this loss, one or more performance metrics (e.g., CPDR, ETER) are selected among the performance metric data 119 for each selected ID of identifier data 118. For instance, if the unit for clustering is sessionID, such performance metric data 119 is estimated per session. Similarly, if the identifier data 118 is an account identifier (e.g., accountID) or person identifier data (e.g., personID), the performance metric data 119 may be averaged over a given period for the accountID/personID (e.g., to determine an average score of the performance metric for each cluster). Estimating performance metric data 119 over sessionIDs/accountIDs/personIDs can be noisy. Therefore, a modeler may be used to compute these metrics over a subset of selected IDs in the training set. The cohort determination component 102 may include logic to discard noisy/low-confidence estimates of performance metric data 119 and/or compute the performance metric data homogeneity loss over a cluster by disregarding outliers.

The goal of attribute heterogeneity loss may be to ensure that certain attributes (e.g., particular skill usage for skills used to process a given natural language request) are similar across clusters to avoid performance differences resulting from different skills (e.g., a music skill vs. a movie skill may have different performance metric data that is attributable to the skill itself rather than to the particular natural language input used to request the action). To enforce this, the attribute heterogeneity loss may be optimized to obtain clusters that are as similar in the domain/skill/device type distribution to one another as possible. Optimizing for this loss may be similar to optimizing for obtaining disentangled representations.

Once the various losses are defined, the clustering algorithm may perform clustering using various techniques. In one example, clustering may be performed using optimization with either single feature representation homogeneity loss or performance metric data 119 homogeneity loss. For instance, the clustering algorithm 120*a* may use either the feature representation homogeneity loss or the performance metric data 119 homogeneity loss (optionally with added attribute heterogeneity loss). The feature representation based homogeneity loss will provide clusters purely based on the content of the data representing the natural language input, while the performance metric data 119 based loss will provide clusters with different values of the performance metric data 119.

In another example, the clustering algorithm 120*a* may use joint optimization in which a modeler can specify jointly optimizing for the three losses. The losses may be weighted to focus more on content-based clustering or clustering based on performance metric data 119.

In another example, the clustering algorithm 120*a* may use iterative optimization in which the clustering algorithm 120*a* performs sequential optimization using the clustering losses over multiple epochs. For example, a sequential optimization based on feature representation homogeneity loss will warm start the clusters for performance metric data 119 based homogeneity loss and vice versa. The clustering algorithm 120*a* may repeat the sequential optimization to obtain maximally homogeneous data points within each cluster.

In another example, cohort determination component 102 may use a neural network 120*b* instead of, or in addition to, the clustering algorithm 120*a*. The neural network 120*b* may be a supervised machine learning model that may be trained to determine a predicted performance 132 for a given input combined data representation 140*b*. For example, the combined data representation 140*b* may represent features describing the input that are extracted using feature extraction 110 (as described above). The neural network 120b may predict a performance level (using one or more performance metrics (described above)) for the combined data representation 140b. In some examples, the neural network 120b may predict whether the current input is likely to be a member of a high-performing cohort or a low-performing cohort (e.g., in a binary classifier implementation). For example, if the natural language processing system 220 is likely to perform well (e.g., above a predetermined threshold as determined using performance metric data 119) for the current input, the neural network 120b may be trained to predict that the current input is likely to be a member of a high-performing cohort. Similarly, if natural language processing system 220 is likely to perform poorly (e.g., below a predetermined threshold as determined using performance metric data 119) for the current input, the neural network 120b may be trained to predict that the current input is likely to be a member of a low-performing cohort. In the above example, a binary classifier implementation of neural network 120b is described. However, the classification may be more granular with multiple output performance clusters (with each cluster representing a different level of performance of the natural language processing system 220). A training data instance for the neural network 120b may include a feature representation representing the natural language input (e.g., as extracted using feature extraction 110) and labeled with a cluster ID and/or with performance metric data 119. Accordingly, the predicted performance 132 may represent the performance score for a given performance metric and/or may include a cluster ID that is associated with a particular range of performance (and/or ranges for multiple different performance metrics).

Evaluation/model training 134 may take a variety of forms depending on the desired implementation. For example, inputs that are predicted to be in low-performing clusters by clustering algorithm 120a and/or neural network 120b may be included in training data sets for one or more machine learning models of the natural language processing system 220 so that such models may be retrained to enhance performance for such inputs. Examples of the machine learning models of natural language processing system 220 that may be trained using such data include ASR models that may transcribe input audio into text data and/or other ASR output representations of the speech, NLU models that may generate intent data semantically representing the natural language input, ranking models that may select a particular natural language processing application (e.g., skill) to process intent data representing the natural language input, etc. Using such data from underserved cohorts may improve the various machine learning model performance such that models may perform well for previously-underserved inputs (as determined using the performance metric data 119). In various further examples, evaluation/model training 134 may interpret the clusters obtained using the clustering algorithm 120a and/or the neural network 120b and may return a list of features that are most informative and/or which carry distinct values across different clusters. For example, the feature differences per cluster may be determined (e.g., the features that are correlated with underperformance may be determined by analyzing the feature differences between clusters and the features associated with clusters with performance metrics that are substandard). Data scientists and/or modelers can use the list of most important features for given clusters to focus on the appropriate techniques to improve their models (e.g., by weighting different features differently according to their relative importance).

Figure 1B:
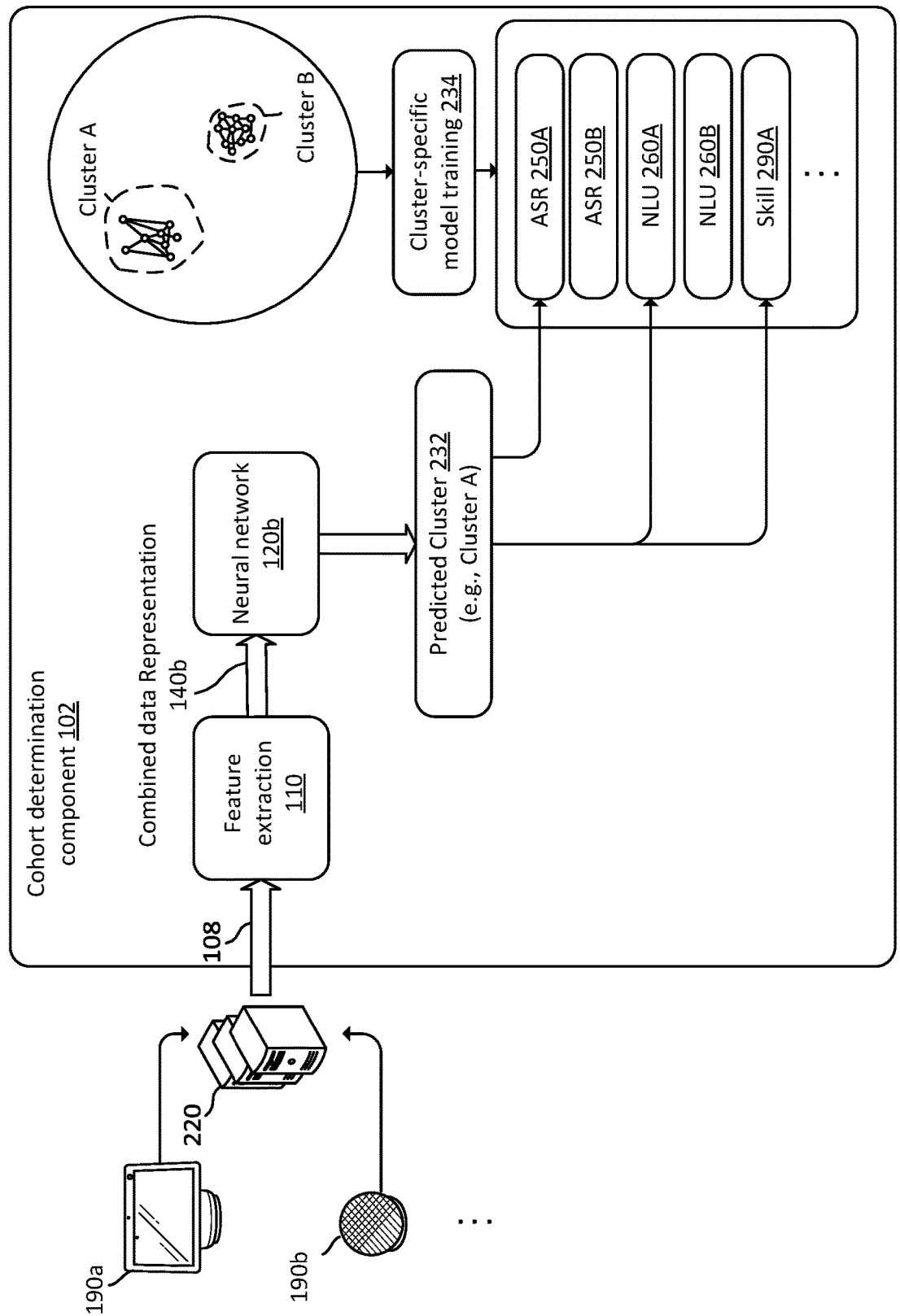
FIG. 1B is a block diagram illustrating use of the cohort determination component to route incoming traffic to one or more natural language processing components, in accordance with various aspects of the present disclosure.

FIG. 1B is a block diagram illustrating use of the cohort determination component to route incoming traffic to one or more natural language processing components, in accordance with various aspects of the present disclosure. In various examples, clusters of different natural language inputs (e.g., cohorts) may be determined as described above in reference to FIG. 1A. As previously described, each cohort may be associated with different levels of performance (e.g., an average performance metric score or other aggregated performance metric) for a given set of machine learning models used during natural language processing (e.g., ASR models, NLU models, NER/ER models, different domain speechlets, etc.).

After determining different clusters (e.g., cluster A, cluster B, etc.), the data points of the cluster (each of which representing a different natural language input clustered on account identifier, person identifier, device identifier, and/or some other identifier data) may be used to train natural language machine learning models for that particular cohort. Although two cohorts (clusters A and B) are shown in FIG. 1B, any number of cohorts may be determined (in accordance with the clustering algorithm parameters (e.g., the "K" in K-means clustering) and/or other machine learning algorithm used to determine the cohorts).

As previously described, data 108 representing characteristics of a natural language input received by one or more devices 190a, 190b, etc., may be used by feature extraction 110 to determine various features of the natural language input. As previously described, the data 108 may represent the audio captured following the wakeword, text data or other data representing the natural language input (e.g., ASR output data), data representing a semantic interpretation of the natural language input (e.g., NLU output data), metadata such as geographic location data associated with devices 190a, 190b, and/or associated with an account identifier registered with devices 190a, 190b, etc., session identifier data identifying a particular natural language processing session (e.g., an identifier referencing a particular dialog between a user and the natural language processing system), a person identifier identifying a particular individual that has registered with the natural language processing system (and who has consented to having identifier data representing them be gathered and used by the natural language processing system to customize performance), etc.

Feature extraction 110 may be used to generate combined data representation 140b representing a combination of the various features determined by feature extraction 110. For example, the various features may be concatenated, averaged, added, etc., to generate the combined data representation 140b. The combined data representation 140b may represent different characteristics of the language used in the natural language input (e.g., diction, vocabulary, syntax, politeness, formality, etc.), different audio characteristics (e.g., MFCC, spectrograms, etc.), and/or error metrics associated with processing of the natural language input. The neural network 120b may be trained to predict the cluster (and thus the cohort) with which the current natural language input will be associated (if the natural language input were to be clustered using the clustering algorithms, as described above in reference to FIG. 1A). In various examples, the neural network 120b may be trained to predict the cluster label using cross-entropy loss. Accordingly, the neural network 120b may determine for each natural language input a predicted cluster 232. In the example in FIG.

1B, the neural network 120*b* has predicted Cluster A for the current natural language input.

Accordingly, data representing the natural language input may be routed to machine learning models that have been trained using data points associated with the predicted cluster (cluster A) using cluster-specific model training 234. In the example in FIG. 1B, ASR 250A, NLU 260A, and skill 290A may be machine learning models used to perform various natural language tasks and which have been trained using data points associated with cluster A (while ASR 250B, NLU 260B, etc., may have been trained using data points associated with cluster B). Accordingly, the current natural language input may be routed to particular machine learning models that may be best able to recognize the natural language input, accurately predict the correct semantic interpretation, and/or accurately predict the desired action for the current natural language input.

Figure 2:
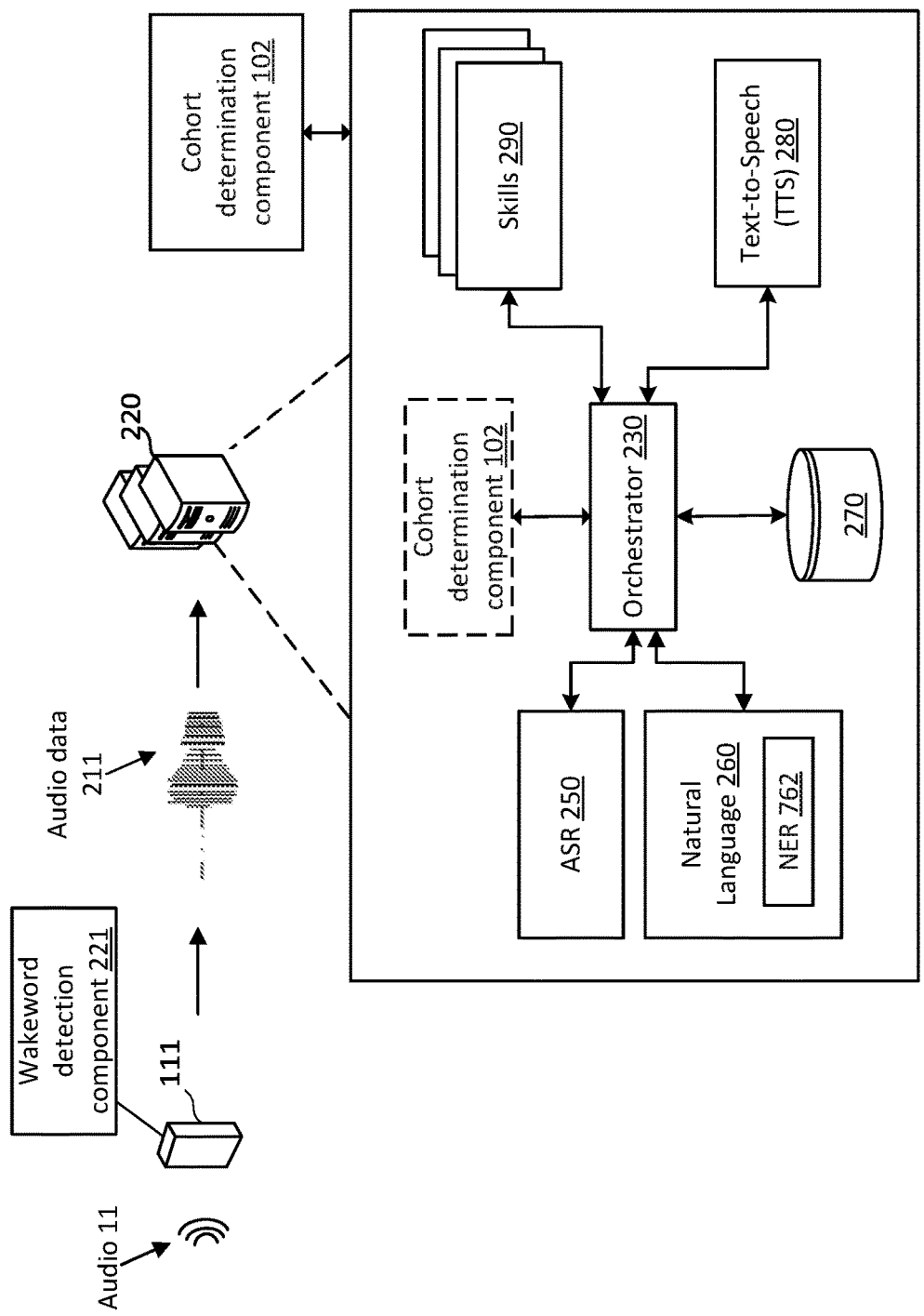
FIG. 2 is a block diagram of various components of a natural language processing system that may be used in accordance with various aspects of the present disclosure.

FIG. 2 is a block diagram of various components of a natural language processing system 220 that may be used in accordance with various aspects of the present disclosure. Although not necessarily limited to such, the system may operate using various natural language processing components as described in FIG. 2. The various components may be located on same or different physical devices. Communication between various components may occur directly or across a network(s). For example, ASR output data (e.g., text data representing a current utterance) output by ASR component 250 may be used to determine an intent of the utterance by natural language component 260. Thereafter, orchestrator component 230 may route the intent to one or more skill components 290 effective to process the intent (as well as slot data included in the utterance) to perform an action. In some cases, the action may include output of synthesized speech using the TTS component 280.

An audio capture component(s), such as a microphone or array of microphones of the device 111 (e.g., a network-connected device that is enabled with natural language processing capability), captures audio 11. The device 111 processes audio data, representing the audio 11, to determine whether speech is detected. The device 111 may use various techniques to determine whether audio data includes speech. Some embodiments may apply voice activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the device 111 may implement a limited classifier configured to distinguish speech from background noise. The classifier may be implemented by techniques such as linear classifiers, support vector machines, and decision trees. In still other examples, Hidden Markov Model (HMM) or Gaussian Mixture Model (GMM) techniques may be applied to compare the audio data to one or more acoustic models in storage, which acoustic models may include models corresponding to speech, noise (e.g., environmental noise or background noise), or silence. Still other techniques may be used to determine whether speech is present in audio data.

Once speech is detected in audio data representing the audio 11, the device 111 may use a wakeword detection component 221 to perform wakeword detection to determine when a user intends to speak an input to the device 111. This process may also be referred to as keyword detection, with a wakeword being a specific example of a keyword. An example wakeword is "Alexa," "Computer," etc.

Wakeword detection is typically performed without performing linguistic analysis, textual analysis, or semantic analysis. Instead, the audio data representing the audio 11 may be analyzed to determine if specific characteristics of the audio data match preconfigured acoustic waveforms, audio signatures, or other data to determine if the audio data "matches" stored audio data corresponding to a wakeword. The stored audio data may be provided by the natural language processing system 220 and/or may be provided by the user.

The wakeword detection component 221 may compare audio data to stored models or data to detect a wakeword. One approach for wakeword detection applies general large vocabulary continuous speech recognition (LVCSR) systems to decode audio signals, with wakeword searching being conducted in the resulting lattices or confusion networks. LVCSR decoding may require relatively high computational resources. Another approach for wakeword spotting builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 221 may be built on deep neural network (DNN)/recursive neural network (RNN) structures directly, without HMM being involved. Such an architecture may estimate the posteriors of wakewords with context information, either by stacking frames within a context window for DNN, or using RNN. Follow-on posterior threshold tuning or smoothing is applied for decision making. Other techniques for wakeword detection, such as those known in the art, may also be used. In some examples, the cohort determination component 102 may be used to improve the machine learning models used by the wakeword detection component 221 (such as those described above).

Once the wakeword is detected, the device 111 may wake and begin sending audio data 211, representing the audio 11, to the natural language processing system 220. The audio data 211 may include data corresponding to the wakeword, or the portion of the audio data 211 corresponding to the wakeword may be removed by the device 111 prior to sending the audio data 211 to the natural language processing system 220.

Upon receipt by the natural language processing system 220, the audio data 211 may be sent to an orchestrator component 230. The orchestrator component 230 may include memory and logic that enable the orchestrator component 230 to transmit various pieces and forms of data to various components of the system, as well as perform other operations. The orchestrator component 230 sends the audio data 211 to an ASR component 250. The ASR component 250 transcribes the audio data 211 into text data. The text data output by the ASR component 250 represents one or more than one (e.g., in the form of an N-best list) hypotheses representing speech represented in the audio data 211. The ASR component 250 interprets the speech in the audio data 211 based on a similarity between the audio data 211 and pre-established language models. For example, the ASR component 250 may compare the audio data 211 with models for sounds (e.g., subword units, such as phonemes, etc.) and sequences of sounds to identify words that match the sequence of sounds of the speech represented in the audio data 211. As previously described, machine learning models of the ASR component 250 may be updated using the cohort determination component 102. The ASR component 250 sends the text data generated thereby to an NLU component 260, for example via the orchestrator component 230. The text data sent from the ASR component 250 to the NLU component 260 may include a top scoring ASR hypothesis or may include an N-best list including multiple ASR hypotheses. An N-best list may additionally include a respective score associated with each ASR hypothesis represented therein. Each score may indicate a confidence of ASR processing performed to generate the ASR hypothesis with which the score is associated.

The NLU component 260 attempts to make a semantic interpretation of the phrases or statements represented in the text data input therein. That is, the NLU component 260 determines one or more meanings associated with the phrases or statements represented in the text data based on words represented in the text data. The NLU component 260 determines an intent (e.g., intent data) representing an action that a user desires be performed as well as pieces of the input text data that allow a device (e.g., the device 111, the natural language processing system 220, etc.) to execute the intent. For example, if the text data corresponds to "call John," the NLU component 260 may determine an intent that the system establish a two-way communication channel between the device 111 originating the call and a device of the recipient "John" (a named entity in the utterance). For further example, if the text data corresponds to "turn up volume on Artist X," the NLU component 260 may determine an intent that the system turn up the volume of playback. Named entity recognition 762 (NER component 762) may be used to determine the slot data "Artist X" in the example request. As previously described, machine learning models of the NLU component 260 (and/or NER component 762) may be updated using the cohort determination component 102 (e.g., by identifying underserved cohorts of inputs that have historically suffered poor performance by the one or more machine learning models of NLU component 260 (and/or NER component 762).

The NLU component 260 outputs NLU results to the orchestrator component 230. The NLU results may include an NLU hypothesis, including a representation of an intent and corresponding slot data (e.g., "Artist X" in the prior example) that may be used by a downstream component to perform the intent. Alternatively, the NLU results data may include multiple NLU hypotheses, with each NLU hypothesis representing an intent and corresponding slotted data. Each NLU hypothesis may be associated with a confidence value representing a confidence of the NLU component 260 in the processing performed to generate the NLU hypothesis associated with the confidence value.

The orchestrator component 230 may send the NLU results to an associated skill component 290. If the NLU results include multiple NLU hypotheses, the orchestrator component 230 may send a portion of the NLU results corresponding to the top scoring NLU hypothesis to a skill component 290 associated with the top scoring NLU hypothesis. The selection of a skill component 290 to which to route a natural language input may be determined using one or more routing and/or skill selection machine learning models. Such models may also be improved using cohort determination component 102, as described above. Although cohort determination component 102 is depicted in FIG. 2 as a separate component from natural language processing system 220, in various examples, cohort determination component 102 may be implemented wholly, or in part, as part of natural language processing system 220, depending on the implementation.

A "skill" or "skill component" may be software running on the natural language processing system 220 that is akin to a software application running on a traditional computing device. That is, a skill component 290 may enable the natural language processing system 220 to execute specific functionality in order to perform one or more actions (e.g., provide information to a user, display content to a user, output music, or perform some other requested action). The natural language processing system 220 may be configured with more than one skill component 290. For example, a weather skill component may enable the natural language processing system 220 to provide weather information, a ride sharing skill component may enable the natural language processing system 220 to schedule a trip with respect to a ride sharing service, a restaurant skill component may enable the natural language processing system 220 to order food with respect to a restaurant's online ordering system, a communications skill component may enable the system to perform messaging or multi-endpoint communications, etc. A skill component 290 may operate in conjunction between the natural language processing system 220 and other devices such as the device 111 or a gateway system in order to complete certain functions. Inputs to a skill component 290 may come from various interactions and input sources. A skill component may include a communications skill component 290a which may correspond to a service for performing media processing that may be operated, for example, by a media processing unit (MPU) as discussed below.

The functionality described herein as a skill or skill component may be referred to using many different terms, such as an action, bot, app, application, speechlet or the like. A skill component 290 may include hardware, software, firmware, or the like that may be dedicated to the particular skill component 290 or shared among different skill components 290. A skill component 290 may be part of the natural language processing system 220 (as illustrated in FIG. 2) or may be located at whole (or in part) with one or more separate systems. Unless expressly stated otherwise, reference to a skill, skill device, or skill component may include a skill component operating within the natural language processing system 220 (for example as skill component 290) and/or skill component operating within a system separate from the natural language processing system 220.

A skill component 290 may be configured to perform one or more actions. A skill may enable a skill component 290 to execute specific functionality in order to provide data or produce some other output requested by a user. A particular skill component 290 may be configured to execute more than one skill. For example, a weather skill may involve a weather skill component providing weather information to the natural language processing system 220, a ride sharing skill may involve a ride sharing skill component scheduling a trip with respect to a ride sharing service, an order pizza skill may involve a restaurant skill component ordering pizza with respect to a restaurant's online ordering system, etc.

A skill component 290 may implement different types of skills. Types of skills include home automation skills (e.g., skills that enable a user to control home devices such as lights, door locks, cameras, thermostats, etc.), entertainment device skills (e.g., skills that enable a user to control entertainment devices such as smart TVs, smart speakers, etc.), video skills, flash briefing skills, gaming skills, as well as custom skills that are not associated with any pre-configured type of skill. A skill may also be associated with media operations that may be performed by an MPU. This allows a skill develop to offer media processing features an independent services that may be invoked by a user. For example, a user may say "Alexa, call mom using CatFace" which may result in the system processing the command to initiate a device-to-device video call between the user's device and a device belonging to the user's mother, while routing the video call through an MPU associated with the "CatFace" skill, which may perform media operations such as recognizing a human face and replacing it with a cat face. As can be appreciated, many different media processing skills may be implemented.

The natural language processing system 220 may include a TTS component 280 that generates audio data (e.g., synthesized speech) from text data using one or more different methods. In one method of synthesis called unit selection, the TTS component 280 matches text data against a database of recorded speech. The TTS component 280 selects matching units of recorded speech and concatenates the units together to form audio data. In another method of synthesis called parametric synthesis, the TTS component 280 varies parameters such as frequency, volume, and noise to create audio data including an artificial speech waveform. Parametric synthesis uses a computerized voice generator, sometimes called a vocoder.

The natural language processing system 220 may include profile storage 270 and/or the gateway system may include its own profile storage. The profile storage 270 may include a variety of information related to individual users, groups of users, etc. that interact with the system. The profile storage 270 may include one or more user profiles, with each user profile being associated with a different user identifier. Each user profile may include various user identifying information. Each user profile may also include preferences of the user. Each user profile may also include one or more device identifiers, representing one or more devices of the user.

The profile storage 270 may include one or more group profiles and/or the person identifier data and/or account identifier data described herein. Each group profile may be associated with a different group identifier. A group profile may be specific to a group of users and/or a group of devices. That is, a group profile may be associated with two or more individual user profiles and/or device profiles. For example, a group profile may be a household profile that is associated with user profiles and/or device profiles associated with multiple users of a single household. A group profile may include preferences shared by all the user profiles and/or device profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile. Although depicted in FIG. 2 as a separate component, natural language processing system 220 may be executed wholly or partially by device 111.

The system may be configured to incorporate user permissions and may only perform activities disclosed herein if approved by a user. As such, the systems, devices, components, and techniques described herein would be typically configured to restrict processing where appropriate and only process user information in a manner that ensures compliance with all appropriate laws, regulations, standards, and the like. The system and techniques can be implemented on a geographic basis to ensure compliance with laws in various jurisdictions and objects in which the component(s) of the system(s) and/or user are located. Permissions may be obtained from a user associated with the device 111, or other devices discussed herein.

Figure 3:
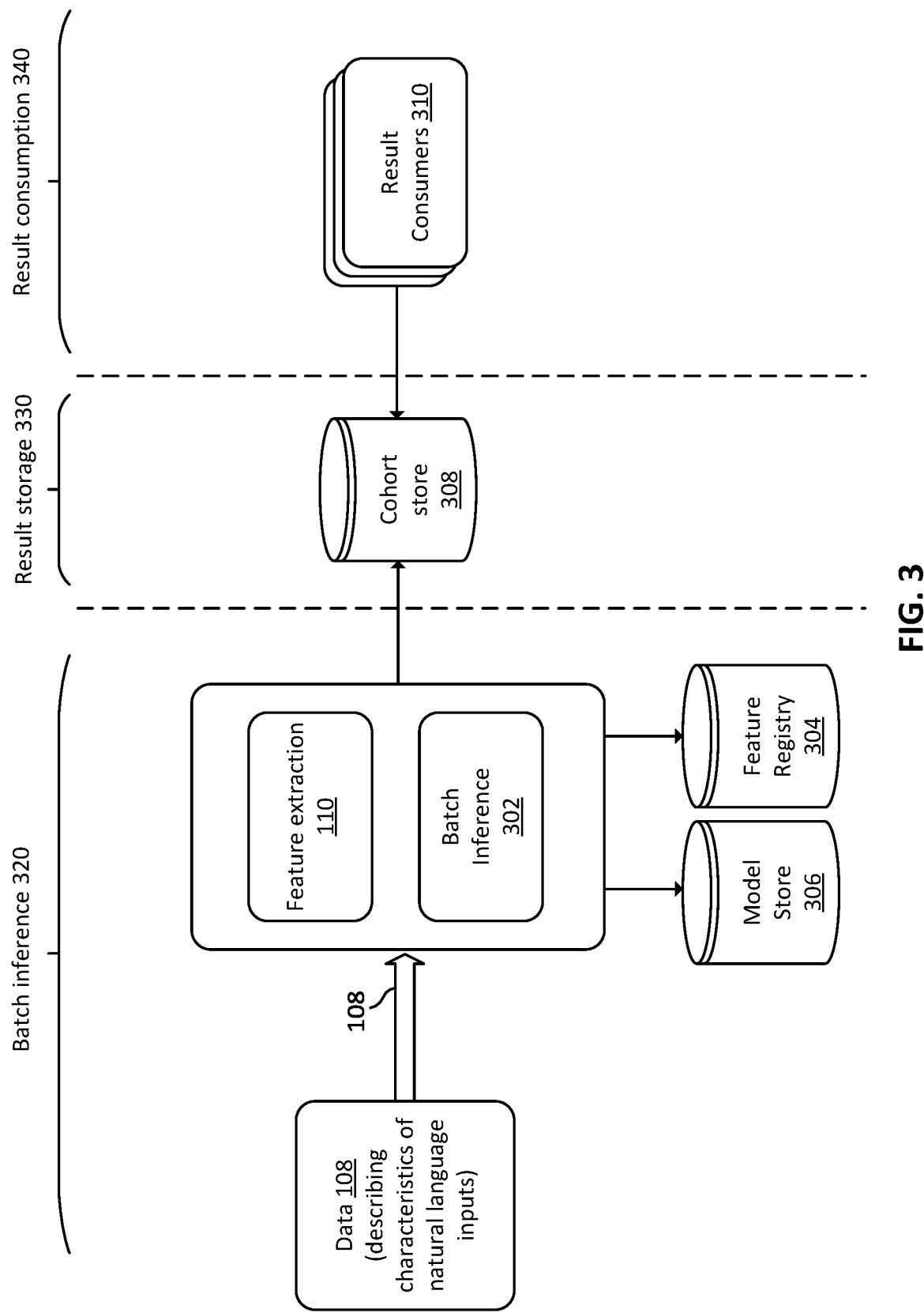
FIG. 3 is another block diagram illustrating various components that may be used with a cohort determination component, in accordance with various aspects of the present disclosure.

FIG. 3 is another block diagram illustrating various components that may be used with a cohort determination component, in accordance with various aspects of the present disclosure. In various examples, a natural language processing system 220 may receive natural language inputs (e.g., spoken requests and/or text inputs). Data 108 may be data that describes characteristics of the natural language inputs and/or performance metric data generated during processing of the natural language inputs by the natural language processing system 220. Data 108 is described in further detail above in reference to FIG. 1A. As previously described, in some examples, the cohort determination component 102 (which may include feature extraction 110, batch inference 302, model store 306, feature registry 304, and/or cohort store 308) may be a component of the natural language system 220.

Batch inference 320 may comprise one or more operations performed by the cohort determination component 102 on data 108. Feature extraction 110 may generate one or more features (e.g., numeric representations of various aspects of a given natural language input). As previously described, the features generated by feature extraction 110 may include acoustic representations of the natural language input, representations of the text, syntax, formality, semantic interpretation, vocabulary, etc. In addition, the features generated by feature extraction 110 may identify performance levels for one or more performance metrics that are generated during the processing of the natural language input by the natural language processing system 220. Performance metrics may represent the predicted error for various processing stages during natural language processing. For example, a word error rate may represent a predicted error of a text interpretation of a given spoken input. Various machine learning models may generate confidence scores (sometimes referred to as uncertainty scores) along with their predictions which may be regarded as performance level for these models. The confidence scores, predicted error rates, etc., may be used as performance metric data to distinguish between different performance levels for different cohorts/clusters. Features generated by feature extraction 110 may further include metadata such as geographic location information, account identifier information, session identifier information, device identifier information, etc. The features to be computed by feature extraction 110 may be stored in a feature registry 304. Accordingly, the particular features used may be defined for a given use case/implementation. The various features may be combined and input into a machine learning model (e.g., clustering algorithm 120a, neural network 120b, etc.) that may be stored in model store 306. In various examples, batch inference 302 may be performed once a given number of inputs have been featurized using feature extraction 110. The machine learning model of cohort determination component 102 (e.g., clustering algorithm 120a, neural network 120b, etc.) may output the cohorts for each input (e.g., for each input of batch inference 302) and the cohort identifiers may be stored in cohort store 308 of result storage 330 for each input (e.g., for each account identifier, session identifier, etc.). Results consumption 340 may comprise a variety of different systems that may consume the results in cohort store 308. For example, each result consumer 310 may represent a different machine learning based system of the natural language processing system 220. Accordingly, the various result consumers 310 may determine underserved cohorts for their particular models/performance metrics and may use the data points to retrain their models to improve performance for the underserved cohorts.

Figure 4:
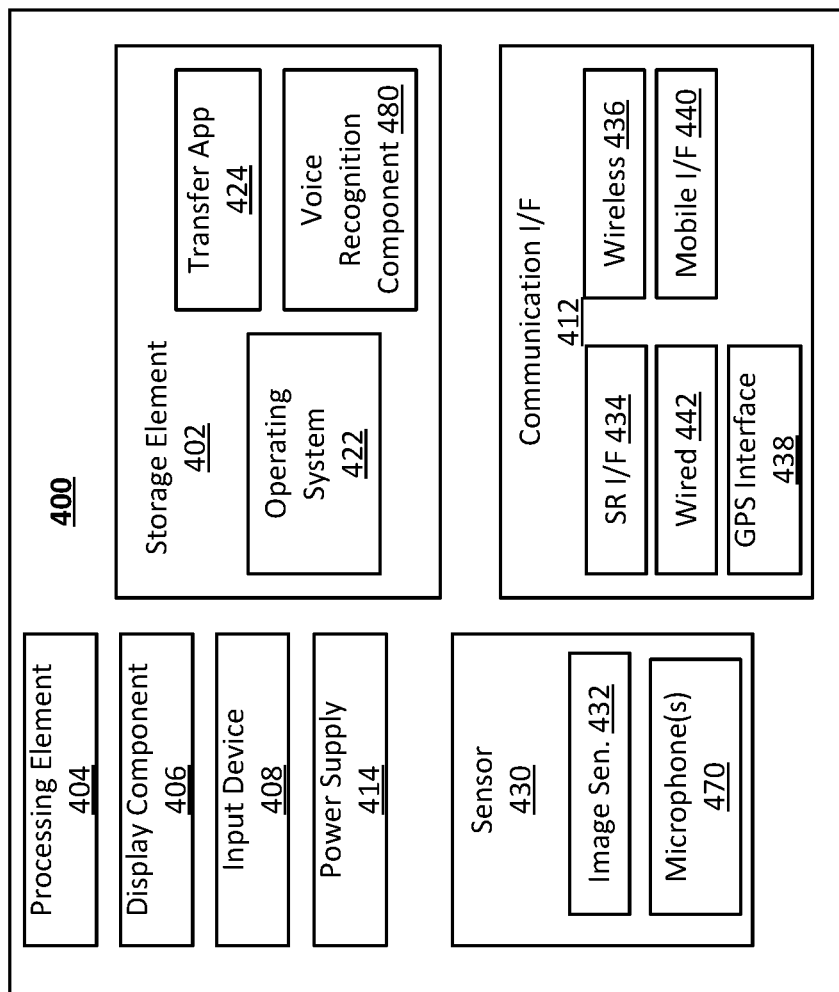
FIG. 4 is a block diagram showing an example architecture of a network-connected device that may be used in accordance with various embodiments described herein.

FIG. 4 is a block diagram showing an example architecture 400 of a network-connected device (e.g., a local network-connected device) that may be used to implement, at least in part, a natural language processing-enable device configured to receive spoken and/or other natural input commands, in accordance with various aspects of the present disclosure. It will be appreciated that not all devices will include all of the components of the architecture 400 and some user devices may include additional components not shown in the architecture 400. The architecture 400 may include one or more processing elements 404 for executing instructions and retrieving data stored in a storage element 402. The processing element 404 may comprise at least one processor. Any suitable processor or processors may be used. For example, the processing element 404 may comprise one or more digital signal processors (DSPs). In some examples, the processing element 404 may be effective to determine a wakeword and/or to stream audio data to a speech processing system. The storage element 402 can include one or more different types of memory, data storage, or computer-readable storage media devoted to different purposes within the architecture 400. For example, the storage element 402 may comprise flash memory, random-access memory, disk-based storage, etc. Different portions of the storage element 402, for example, may be used for program instructions for execution by the processing element 404, storage of images or other digital works, and/or a removable storage for transferring data to other devices, etc. In various examples, the storage element 402 may comprise cohort determination component 102.

The storage element 402 may also store software for execution by the processing element 404. An operating system 422 may provide the user with an interface for operating the computing device and may facilitate communications and commands between applications executing on the architecture 400 and various hardware thereof. A transfer application 424 may be configured to receive images, audio, and/or video from another device (e.g., a mobile device, image capture device, and/or display device) or from an image sensor 432 and/or microphone 470 included in the architecture 400. In some examples, the transfer application 424 may also be configured to send the received voice requests to one or more voice recognition servers.

When implemented in some user devices, the architecture 400 may also comprise a display component 406. The display component 406 may comprise one or more light-emitting diodes (LEDs) or other suitable display lamps. Also, in some examples, the display component 406 may comprise, for example, one or more devices such as cathode ray tubes (CRTs), liquid-crystal display (LCD) screens, gas plasma-based flat panel displays, LCD projectors, raster projectors, infrared projectors or other types of display devices, etc. As described herein, display component 406 may be effective to display content determined provided by a skill executed by the processing element 404 and/or by another computing device.

The architecture 400 may also include one or more input devices 408 operable to receive inputs from a user. The input devices 408 can include, for example, a push button, touch pad, touch screen, wheel, joystick, keyboard, mouse, trackball, keypad, light gun, game controller, or any other such device or element whereby a user can provide inputs to the architecture 400. These input devices 408 may be incorporated into the architecture 400 or operably coupled to the architecture 400 via wired or wireless interface. In some examples, architecture 400 may include a microphone 470 or an array of microphones for capturing sounds, such as voice requests. Voice recognition component 480 may interpret audio signals of sound captured by microphone 470. In some examples, voice recognition component 480 may listen for a "wakeword" to be received by microphone 470. Upon receipt of the wakeword, voice recognition component 480 may stream audio to a voice recognition server for analysis, such as a speech processing system. In various examples, voice recognition component 480 may stream audio to external computing devices via communication interface 412.

When the display component 406 includes a touch-sensitive display, the input devices 408 can include a touch sensor that operates in conjunction with the display component 406 to permit users to interact with the image displayed by the display component 406 using touch inputs (e.g., with a finger or stylus). The architecture 400 may also include a power supply 414, such as a wired alternating current (AC) converter, a rechargeable battery operable to be recharged through conventional plug-in approaches, or through other approaches such as capacitive or inductive charging.

The communication interface 412 may comprise one or more wired or wireless components operable to communicate with one or more other computing devices. For example, the communication interface 412 may comprise a wireless communication module 436 configured to communicate on a network, such as a computer communication network, according to any suitable wireless protocol, such as IEEE 802.11 or another suitable wireless local area network (WLAN) protocol. A short range interface 434 may be configured to communicate using one or more short range wireless protocols such as, for example, near field communications (NFC), Bluetooth, Bluetooth LE, etc. A mobile interface 440 may be configured to communicate utilizing a cellular or other mobile protocol. A Global Positioning System (GPS) interface 438 may be in communication with one or more earth-orbiting satellites or other suitable position-determining systems to identify a position of the architecture 400. A wired communication module 442 may be configured to communicate according to the USB protocol or any other suitable protocol.

The architecture 400 may also include one or more sensors 430 such as, for example, one or more position sensors, image sensors, and/or motion sensors. An image sensor 432 is shown in FIG. 4. An example of an image sensor 432 may be a camera configured to capture color information, image geometry information, and/or ambient light information.

Figure 5:
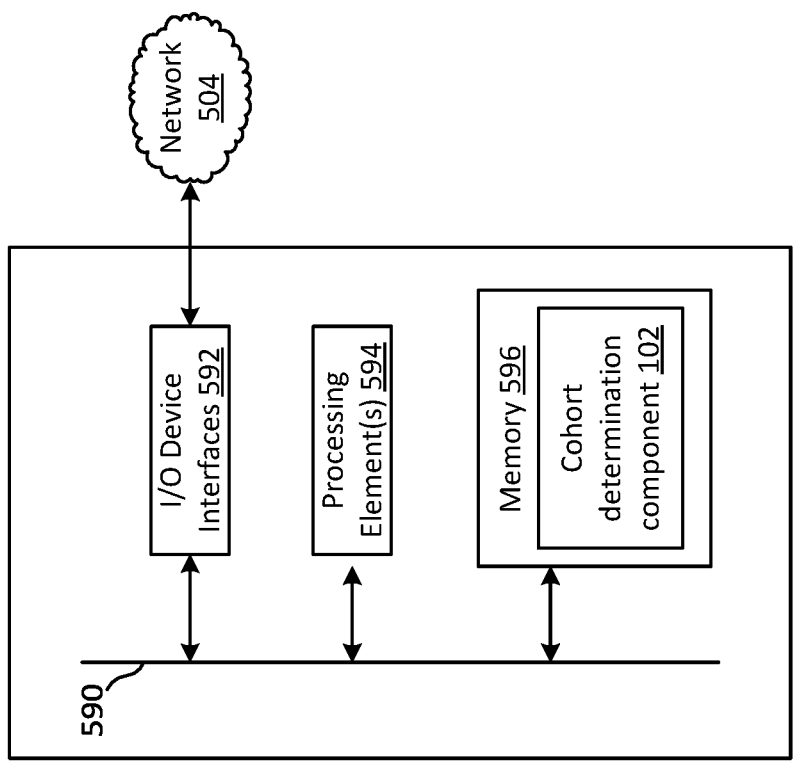
FIG. 5 is a block diagram showing an example architecture of a computing device that may be used in accordance with various embodiments described herein.

FIG. 5 is a block diagram conceptually illustrating example components of a remote device, such as a computing device executing a particular skill, a computing device executing one or more components of a speech processing system (e.g., ASR processing components, NLU processing components, applicable protocol recognition, etc.) and/or command processing. Multiple computing devices may be included in the system, such as one speech processing computing device for performing ASR processing, one speech processing computing device for performing NLU processing, one or more skill computing device(s) implementing skills, etc. In operation, each of these devices (or groups of devices) may include non-transitory computer-readable and computer-executable instructions that reside on the respective device, as will be discussed further below. The remote device of FIG. 5 may communicate with one or more other devices over a network 504 (e.g., a wide area network or local area network).

Each computing device of a speech processing system may include one or more controllers/processors 594, which may each include at least one central processing unit (CPU) for processing data and computer-readable instructions, and a memory 596 for storing data and instructions of the respective device. In at least some examples, memory 596 may store, for example, a list of N-best intents data that may be generated for particular request data. In some examples, memory 596 may store machine learning models of the NLU component 260, such as machine learned models associated with various NLU process flows, when loaded from memory 596. In various further examples, memory 596 may be effective to store instructions effective to program controllers/processors 594 to perform the various techniques described above in reference to FIGS. 1-3. Accordingly, in FIG. 5, cohort determination component 102 is depicted as being stored within memory 596, as an example. The memories 596 may individually include volatile random access memory (RAM), non-volatile read only memory (ROM), non-volatile magnetoresistive memory (MRAM), and/or other types of memory. Each computing device of a speech processing system (and/or a component thereof) may also include memory 596 for storing data and controller/processor-executable instructions. Each memory 596 may individually include one or more non-volatile storage types such as magnetic storage, optical storage, solid-state storage, etc. Each computing device of a speech processing system may also be connected to removable or external non-volatile memory and/or storage (such as a removable memory card, memory key drive, networked storage, etc.) through respective input/output device interfaces 592. In various examples, the feature data and/or training data used by the various machine learning models may be stored and/or cached in memory 596.

Computer instructions for operating each computing device of natural language processing system 220 may be executed by the respective device's controllers/processors 594, using the memory 596 as temporary "working" storage at runtime. A device's computer instructions may be stored in a non-transitory manner in non-volatile memory 596 (e.g., a non-transitory computer-readable memory), memory 596, or an external device(s). Alternatively, some or all of the executable instructions may be embedded in hardware or firmware on the respective device in addition to or instead of software.

Each computing device of speech processing system 100 includes input/output device interfaces 592. A variety of components may be connected through the input/output device interfaces 592, as will be discussed further below. Additionally, each computing device of a speech processing system may include an address/data bus 590 for conveying data among components of the respective device. Each component within a computing device of a speech processing system may also be directly connected to other components in addition to (or instead of) being connected to other components across the bus 590.

As noted above, multiple devices may be employed in a single system. In such a multi-device system, each of the devices may include different components for performing different aspects of the system's processing. The multiple devices may include overlapping components. The components of a speech processing system, as described herein, are exemplary, and may be located as a stand-alone device or may be included, in whole or in part, as a component of a larger device or system.

Figure 6:
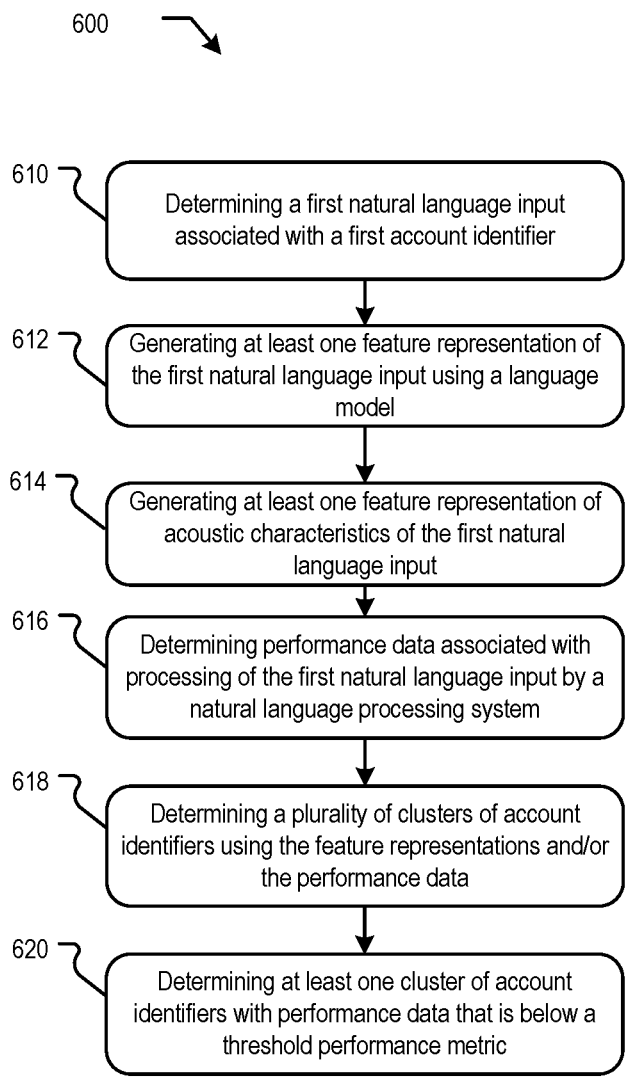
FIG. 6 depicts a flow chart showing an example process for cohort determination for natural language processing, in accordance with various aspects of the present disclosure.

FIG. 6 depicts a flow chart showing an example process for cohort determination for natural language processing, in accordance with various aspects of the present disclosure. Those portions of FIG. 6 that have been previously discussed in reference to FIGS. 1-5 may not be described again for purposes of clarity and brevity. The actions of the process 600 may represent a series of instructions comprising computer-readable machine code executable by one or more processing units of one or more computing devices. In various examples, the computer-readable machine codes may be comprised of instructions selected from a native instruction set of and/or an operating system (or systems) of the one or more computing devices. Although the figures and discussion illustrate certain operational steps of the system in a particular order, the steps described may be performed in a different order (as well as certain steps removed or added) without departing from the intent of the disclosure.

Process 600 may begin at action 610, at which a first natural language input associated with a first account identifier may be determined. The first natural language input may represent a first request spoken (or otherwise input) by a first user and processed by a natural language processing system (e.g., natural language processing system 220). The first account identifier may represent an account of the user from which the first natural language input was received.

Processing may continue at action 612, at which at least one feature representation of the first natural language input is generated using a language model. For example, a transformer-based language model may generate a numeric feature representation of the first natural language input. The feature representation may represent the words of the first natural language input as well as the order of the words, the semantic meaning of the words, the syntax, grammar, formality, etc., depending on the implementation.

Processing may continue at action 614, at which at least one feature representation of acoustic characteristics of the first natural language input may be generated. For example, one or more machine learning models may take the audio of the first natural language input as an input and may determine data describing characteristics of that audio (e.g., pitch, MFCCs, spectrograms, etc.).

Processing may continue at action 616, at which performance data associated with processing of the first natural language input by a natural language processing system may be generated. In various examples, the performance data may represent data generated by various components (e.g., NLU component 260, ASR component 250, wakeword detection component 221, NER 762, etc.) indicating a performance of those systems when processing the first natural language input. As described previously, examples of such performance data may include customer perceived defect rate (CPDR), a word error rate (WER), NLU error rate, data representing user friction in dialog, etc.

Processing may continue at action 618, at which a plurality of clusters of account identifiers may be determined using the feature representations and/or the performance data. For example, an unsupervised clustering algorithm (e.g., K-means clustering, etc.) may be used to cluster similar data points (e.g., similar natural language inputs) together in a common feature space. The various features determined at acitons 612, 614 (among other possible features) may be aggregated into a combined feature representation. The clustering algorithm may be effective to group similar features into clusters. As described above, one or more of a feature representation homogeneity loss, a performance metric homogeneity loss, and an attribute heterogeneity loss may be used to train the clustering model to cluster natural language inputs (including the first natural language input).

Processing may continue at action 620, at which at least one cluster of account identifiers with performance data that is below a threshold performance metric may be determined. For example, after forming the clusters, the average performance metric score (or some other aggreated performance metric score or scores) associated with each cluster may be determined. A threshold performance metric may be determined. This threshold performance metric may be determined empirically and/or statistically as an outlier. This threshold performance metric may indicate poor performance by the relevant model of the natural language processing system (e.g., for ASR component 250 a WER that is above a particular threshold may indicate poor performance). Clusters with performance data that is below a threshold may be identified and data points (e.g., feature representations of the natural language inputs) of that cluster may be included in a training data set that may be used to retrain the relevant machine learning models of the natural language processing system. In this way, the relevant machine learning models may be improved such performance may be improved for previously underserved cohorts of individuals.

Figure 7:
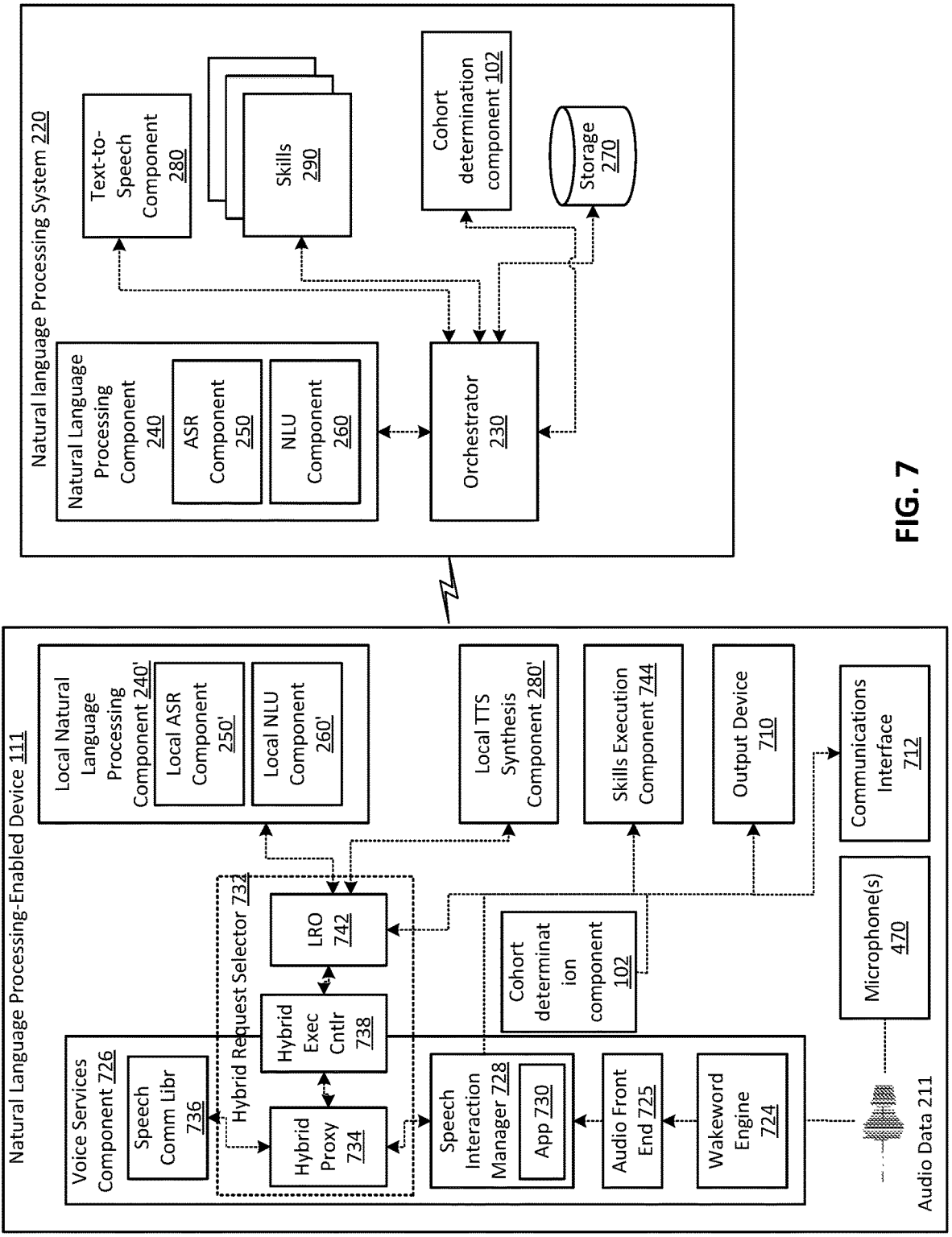
FIG. 7 is a block diagram illustrating a natural language processing enabled device and a natural language processing system, in accordance with embodiments of the present disclosure.

FIG. 7 is a block diagram illustrating a device 111 (e.g., a natural language processing enabled device) and a natural language processing system 220, in accordance with embodiments of the present disclosure. In various examples, device 111 may be a natural language processing-enabled device and may include microphones (e.g., far-field microphone arrays) used to transform audio into electrical signals. The device 111 may be among the network-connected devices described herein that are local to (e.g., communicating on the same LAN) the network-connected devices. Natural language processing may then be performed, either locally by the natural language processing components of device 111, by one or more other computing devices communicating with the device 111 over a network (e.g., natural language processing system 220), or by some combination of the device 111 and the one or more other computing devices. In various examples, device 111 may include and/or may be configured in communication with output device(s) 710 (e.g., speakers, displays, and/or other network connected devices among network-connected devices) effective to output information obtained in response to a user's spoken request or command, or to output content that may be of interest to one or more users. As used herein, a display of the device 111 refers to a display effective to output graphics such as images and/or video. Further, as used herein, a displayless device refers to a device that does not include a display that is effective to render graphical images or text.

In various examples, the device 111 may include and/or may be configured in communication with cohort determination component 102. Accordingly, the device 111 may be used to predict a cohort for a given natural language input. In various examples, the prediction of a cohort may be used to select from among different machine learning models, different parameter sets, and/or different parameter weights that may be used to process the natural language input. In some other examples, natural language inputs that are determined to be members of underserved cohorts may be included in training data sets that are used to retrain machine learning models of the natural language processing system 220 and/or of device 111, in order to improve performance of such models.

A natural language processing-enabled computing system may respond to user utterances by outputting content and/or performing one or more other actions, such as playing music, providing information, calling a taxi, displaying an image, etc. Generally, input data received by the various natural language processing systems and components described herein may comprise natural language input data. Natural language input data may be in the form of audio data representing spoken user utterances (e.g., a spoken user request), text data (e.g., a request typed by a user), gesture data (e.g., data representing a user shaking their head while wearing ear buds, making a hand gesture, etc.), and/or some combination of text data, gesture data, and/or audio data.

Speech-processing systems may be configured with multiple applications (e.g., thousands, tens of thousands, or more applications) that can be used to potentially respond to a user request. Applications may be referred to herein as "skills." Natural language processing systems may be effective to process spoken and/or textual natural language inputs to determine data representing a semantic understanding of the inputs. Skills may include any application effective to communicate with a natural language processing system in order to take one or more actions based on inputs from the natural language processing system. For example, a speech-processing system may include music skills, video skills, calendar skills, timer skills, general knowledge answering skills, game skills, device control skills, etc. As described herein, skills receive NLU data comprising slot data and/or intent data and are configured to determine one or more actions based on the slot data and/or intent data. Examples of such actions may include text to be processed into output audio data (e.g., synthetic speech) via a text-to-speech (TTS) component, an executable command effective to play a song from a music service, a movie from a movie service, or the like, an executable command effective to cause a system to perform an action (e.g., turning lights on/off, controlling an appliance, purchasing an item, etc.).

The invocation of a skill by a user's utterance may include a request that an action be taken. The number of applications/skills continues to grow and the rate of growth is increasing as developers become more accustomed to application programming interfaces (APIs) and application development kits provided for the voice user interface system. Rule-based approaches and/or predefined utterance matching may be used in some systems for processing requests spoken in a certain format to invoke a particular application. In at least some examples, a "skill," "skill component," "skill," "natural language processing skill," and the like may be software running on a computing device, similar to a traditional software application running on a computing device. Such skills may include a voice user interface in addition to or instead of, in at least some instances, a graphical user interface, smart home device interface, and/or other type of interface.

In addition to using the microphone(s) 470 to capture utterances and convert them into digital audio data 211, the device 111 may additionally, or alternatively, receive audio data 211 (e.g., via the communications interface 712) from another device in the environment. In various examples, the device 111 may capture video and/or other image data using a camera. Under normal conditions, the device 111 may operate in conjunction with and/or under the control of a remote, network-based or network-accessible natural language processing system 220. The natural language processing system 220 may, in some instances, be part of a network-accessible computing platform that is maintained and accessible via a wide area network (WAN). Network-accessible computing platforms such as this may be referred to using terms such as "on-demand computing", "software as a service (SaaS)", "platform computing", "network-accessible platform", "cloud services", "data centers", and so forth. The natural language processing system 220 may be configured to provide particular functionality to large numbers of local (e.g., in-home, in-car, etc.) devices of different users. The WAN is representative of any type of public or private, wide area network, such as the Internet, which extends beyond the environment of the device 111. Thus, the WAN may represent and/or include, without limitation, data and/or voice networks, a wired infrastructure (e.g., coaxial cable, fiber optic cable, etc.), a wireless infrastructure (e.g., radio frequencies (RF), cellular, satellite, etc.), and/or other connection technologies.

In some embodiments, the natural language processing system 220 may be configured to receive audio data 211 from the device 111, to recognize speech in the received audio data 211, and to perform functions in response to the recognized speech. In some embodiments, these functions involve sending a command, from the natural language processing system 220, to the device 111 to cause the device 111 to perform an action, such as output an audible response to the user speech via output device 710 (e.g., one or more loudspeakers). Thus, under normal conditions, when the device 111 is able to communicate with the natural language processing system 220 over a WAN (e.g., the Internet), some or all of the functions capable of being performed by the natural language processing system 220 may be performed by sending a command over a WAN to the device 111, which, in turn, may process the command for performing actions. For example, the natural language processing system 220, via a remote command that is included in remote response data, may instruct the device 111 to output an audible response (e.g., using a local text-to-speech (TTS) synthesis component 280) to a user's question, to output content (e.g., music) via output device 710 (e.g., one or more loudspeakers) of the device 111, or to control other devices in the local environment (e.g., the user's home). It is to be appreciated that the natural language processing system 220 may be configured to provide other functions, in addition to those discussed herein, such as, without limitation, providing step-by-step directions for navigating from an origin to a destination location, conducting an electronic commerce transaction on behalf of a user as part of a shopping function, establishing a communication session between the current user and another user, etc.

In order to process voice commands locally, the device 111 may include a local voice services component 726. When a user utterance including the wakeword is captured by the microphone 470 of the device 111, the audio data 211 representing the utterance is received by a wakeword engine 724 of the voice services component 726. The wakeword engine 724 may be configured to compare the audio data 211 to stored models used to detect a wakeword (e.g., "Computer") that indicates to the device 111 that the audio data 211 is to be processed for determining an intent. Thus, the wakeword engine 724 is configured to determine whether a wakeword is detected in the audio data 211, and, if a wakeword is detected, the wakeword engine 724 can proceed with routing the audio data 211 to an audio front end (AFE) 725 (sometimes referred to as an acoustic front end (AFE)) of the voice services component 726. If a wakeword is not detected in the audio data 211, the wakeword engine 724 can refrain from sending the audio data 211 to the AFE 725, thereby preventing the audio data 211 from being further processed. The audio data 211 can be discarded.

The AFE 725 is configured to transform the audio data 211 received from the wakeword engine 724 into data for processing by a suitable ASR component and/or NLU component. The AFE 725 may reduce noise in the audio data 211 and divide the digitized audio data 211 into frames representing a time intervals for which the AFE 725 determines a number of values, called features, representing the qualities of the audio data 211, along with a set of those values, called a feature vector, representing the features/qualities of the audio data 211 within the frame. Many different features may be determined, and each feature represents some quality of the audio data 211 that may be useful for ASR processing and/or NLU processing. A number of approaches may be used by the AFE 725 to process the audio data 211, such as mel-frequency cepstral coefficients (MFCCs), perceptual linear predictive (PLP) techniques, neural network feature vector techniques, linear discriminant analysis, semi-tied covariance matrices, or other approaches known to those of skill in the art. In some embodiments, the AFE 725 is configured to use beamforming data to process the received audio data 211. Beamforming can be used to distinguish between the directions from which speech and noise originate. Accordingly, the microphones 470 may be arranged in a beamforming array to receive multiple audio signals, where multiple audio sources including speech may be identified in different beams and processed. Beamforming may involve processing multiple audio signals (e.g., originating from multiple microphones in a microphone array) together, such as by time shifting one audio signal with respect to another audio signal, to increase the signal and decrease the noise in the audio. Time offsets in the audio data 211, used by the AFE 725 in beamforming, may be determined based on results of the wakeword engine 724's processing of the audio data 211. For example, the wakeword engine 724 may detect the wakeword in the audio data 211 from a first microphone 470 at time, t, while detecting the wakeword in the audio data 211 from a second microphone 470 a millisecond later in time (e.g., time, t+1 millisecond), and so on and so forth, for any suitable number of audio signals corresponding to multiple microphones 470 in a microphone array.

A speech interaction manager (SIM) 728 of the voice services component 726 may receive the audio data 211 that has been processed by the AFE 725. The SIM 728 may manage received audio data 211 by processing request data and non-speech noise or sounds as events, and the SIM 728 may also manage the processing of commands that are used to respond to the user speech or non-speech noise or sounds (e.g., by controlling the action(s) of natural language processing components of device 111). The SIM 728 may include one or more client applications 730 for performing various functions at the device 111.

A hybrid request selector component 732 of the device 111 is shown as including a hybrid proxy component (HP) 734, among other components. The HP 734 can be implemented as a layer within the voice services component 726 that is located between the SIM 728 and a speech communication library (SCL) 736, and may be configured to proxy traffic to/from the natural language processing system 220. For example, the HP 734 may be configured to pass messages between the SIM 728 and the SCL 736 (such as by passing events and instructions there between), and to send messages to/from a hybrid execution controller component (HEC) 738 of the hybrid request selector component 732.

For instance, command data received from the natural language processing system 220 can be sent to the HEC 738 using the HP 734, which sits in the path between the SCL 736 and the SIM 728. The HP 734 may also be configured to allow audio data 211 received from the SIM 728 to pass through to the natural language processing system 220 (via the SCL 736) while also receiving (e.g., intercepting) this audio data 211 and sending the received audio data 211 to the HEC 738 (sometimes via an additional SCL).

As will be described in more detail below, the HP 734 and the HEC 738 are configured to perform a handshake procedure to connect to each other. As part of this handshake procedure, the HP 734 and the HEC 738 exchange data including, without limitation, configurations, context, settings, device identifiers (ID), networking protocol versions, time zones, and language data (sometimes referred to herein as "locale data"). Based on at least some of this data (e.g., based at least in part on the language data) exchanged during the handshake procedure, the HEC 738 determines whether to accept or reject the connection request from the HP 734. If the HEC 738 rejects the HP's 734 connection request, the HEC 738 can provide metadata to the HP 734 that provides a reason why the connection request was rejected.

A local natural language processing component 240' (sometimes referred to as a "natural language processing component," a "spoken language understanding (SLU) component," a "speech engine," or an "engine") is configured to process audio data 211 (e.g., audio data 211 representing user speech, audio data 211 representing non-speech noise or sounds, etc.). In some embodiments, the hybrid request selector component 732 may further include a local request orchestrator component (LRO) 742. The LRO 742 is configured to notify the local natural language processing component 240' about the availability of new audio data 211 that represents user speech, and to otherwise initiate the operations of the local natural language processing component 240' when new audio data 211 becomes available. In general, the hybrid request selector component 732 may control the execution of the local natural language processing component 240', such as by sending "execute" and "terminate" events/instructions to the local natural language processing component 240'. An "execute" event may instruct the local natural language processing component 240' to continue any suspended execution based on audio data 211 (e.g., by instructing the local natural language processing component 240' to execute on a previously-determined intent in order to generate a command). Meanwhile, a "terminate" event may instruct the local natural language processing component 240' to terminate further execution based on the audio data 211, such as when the device 111 receives command data from the natural language processing system 220 and chooses to use that remotely-generated command data.

The LRO 742 may interact with a skills execution component 744 that is configured to receive intent data output from the local natural language processing component 240' and to execute a skill based on the intent.

To illustrate how the device 111 can operate at runtime, consider an example where a user utters an expression, such as "Computer, turn off the kitchen lights." The audio data 211 is received by the wakeword engine 724, which detects the wakeword "Computer," and forwards the audio data 211 to the SIM 728 via the AFE 725 as a result of detecting the wakeword. The SIM 728 may send the audio data 211 to the HP 734, and the HP 734 may allow the audio data 211 to pass through to the natural language processing system 220 (e.g., via the SCL 736), and the HP 734 may also input the audio data 211 to the local natural language processing component 240' by routing the audio data 211 through the HEC 738 of the hybrid request selector 732, whereby the LRO 742 notifies the local natural language processing component 240' of the incoming audio data 211. At this point, the hybrid request selector 732 may wait for response data from the natural language processing system 220 and/or the local natural language processing component 240'.

The local natural language processing component 240' is configured to receive the audio data 211 from the hybrid request selector 732 as input, to recognize speech (and/or non-speech audio events) in the audio data 211, to determine an intent (e.g., user intent) from the recognized speech (or non-speech audio event). This intent can be provided to the skills execution component 744 via the LRO 742, and the skills execution component 744 can determine how to act on the intent by generating directive data. In some cases, a directive may include a description of the intent (e.g., an intent to turn off {device A}). In some cases, a directive may include (e.g., encode) an identifier of a second device, such as the kitchen lights, and an operation to be performed at the second device. Directive data that is generated by the skills execution component 744 (and/or the natural language processing system 220) may be formatted using Java, such as JavaScript syntax, or JavaScript-based syntax. This may include formatting the directive using JSON. In some embodiments, a locally-generated directive may be serialized, much like how remotely-generated directives are serialized for transmission in data packets over the network. In other embodiments, a locally-generated directive is formatted as a programmatic API call with a same logical operation as a remotely-generated directive. In other words, a locally-generated directive may mimic remotely-generated directives by using a same, or a similar, format as the remotely-generated directive.

The local natural language processing component 240' may include an automatic speech recognition (ASR) component 250' that is configured to perform ASR processing on the audio data 211 to convert the audio data 211 into text data (sometimes referred to herein as "ASR text data," an "ASR result", or "ASR data"). ASR transcribes audio data 211 into text data representing the words of the user speech contained in the audio data 211. A spoken utterance in the audio data 211 can be input to the local ASR component 250', which then interprets the utterance based on the similarity between the utterance and pre-established language models available to the local natural language processing component 240'. In some embodiments, the local ASR component 250' outputs the most likely text recognized in the audio data 211, or multiple hypotheses in the form of a lattice or an N-best list with individual hypotheses corresponding to confidence scores or other scores (such as probability scores, etc.). In some embodiments, the local ASR component 250' is customized to the user (or multiple users) who created a user account to which the device 111 is registered. For instance, the language models (and other data) used by the local ASR component 250' may be based on known information (e.g., preferences) of the user, and/or on a history of previous interactions with the user.

The local natural language processing component 240' may also include a local NLU component 260' that performs NLU processing on the generated ASR text data to determine intent data and/or slot data (referred to herein as a "NLU result", or "NLU data") so that directives may be determined (e.g., by the skills execution component 744) based on the intent data and/or the slot data. Generally, the local NLU component 260' takes textual input (such as text data generated by the local ASR component 250') and attempts to make a semantic interpretation of the ASR text data.

Natural Language Processing System

In other situations, the device 111 may send the audio data 211 to the natural language processing system 220 for processing. As described above, the device 111 may capture audio using the microphone 470, and send audio data 211 (e.g., representing a spoken user request), corresponding to the captured audio, to the natural language processing system 220. The device 111 may include a wakeword detection component that detects when input audio includes a spoken wakeword, and when the wakeword is detected, the audio data 211 is sent by the device 111 to the natural language processing system 220.

Upon receipt by the natural language processing system 220, the audio data 211 may be sent to an orchestrator component 230. The orchestrator component 230 may include memory and logic that enables the orchestrator component 230 to send various pieces and forms of data to various components of the system.

Similar to the operation described above with respect to the local natural language processing component 240' of the device 111, the orchestrator component 230 may send the audio data 211 to a natural language processing component 240. An ASR component 250 of the natural language processing component 240 transcribes the audio data 211 into one or more hypotheses representing speech contained in the audio data 211. The natural language processing component 240 interprets the speech in the audio data based on a similarity between the characteristics of the audio data corresponding to the speech and pre-established language models. For example, the natural language processing component 240 may compare the audio data 211 with models for sounds (e.g., subword units such as phonemes) and sequences of sounds to identify words that match the sequence of sounds in the speech represented in the audio data 211. The natural language processing component 240 may send text data generated thereby to an NLU component 260 of the natural language processing component 240. The text data output by the natural language processing component 240 may include a top scoring hypothesis of the speech represented in the audio data 211 or may include an N-best list including a group of hypotheses of the speech represented in the audio data 211, and potentially respective scores ASR processing confidence scores.

The NLU component 260 attempts to make a semantic interpretation of the phrases or statements represented in the text data input therein. That is, the NLU component 260 determines one or more meanings associated with the phrases or statements represented in the text data based on individual words represented in the text data. The NLU component 260 interprets a text string to derive an intent of the user (e.g., an action that the user desires be performed) as well as pertinent pieces of information in the text data that allow a device (e.g., the natural language processing system 220) to complete the intent. For example, if the text data corresponds to "Play the new album by [Musical_Artist]", the NLU component 260 may determine the user intended to invoke a music playback intent to play the identified album.

The natural language processing system 220 may include a non-transitory computer-readable memory storage 270, storing various instructions for operation of the natural language processing system 220. As previously described, in some examples, the cohort determination component 102 may be instantiated as a part of the natural language processing system 220 and/or as a separate component configured in communication with the natural language processing system 220.

As described above, the natural language processing system 220 may include one or more skill components 290. The natural language processing system 220 may also include a TTS component 280 that synthesizes speech (e.g., generates audio data) corresponding to text data input therein. The TTS component 280 may perform speech synthesis using one or more different methods. In one method of synthesis called unit selection, the TTS component 280 matches text data against one or more databases of recorded speech. Matching units are selected and concatenated together to form audio data. In another method of synthesis called parametric synthesis, the TTS component 280 varies parameters such as frequency, volume, and noise to create an artificial speech waveform output. Parametric synthesis uses a computerized voice generator, sometimes called a vocoder.

The various components of the natural language processing system 220 and the device 111 described herein may be implemented in software, hardware, firmware, or some combination thereof.

The natural language processing system 220 may reside on device 111, in a cloud computing environment, or some combination thereof. For example, the device 111 may include computing equipment, some portion of which is configured with some or all of the components or functionality of natural language processing system 220 and another portion of which is configured with some or all of the components or functionality of computing device(s) used in natural language processing system 220. The device 111 may then perform a variety of functions on its own (such as when remote communications are unavailable), and/or may communicate (when capable) with computing device(s) and/or the natural language processing system 220 to perform other functions. Alternatively, all of the functionality may reside on the device 111 or remotely.

Although various systems described herein may be embodied in software or code executed by general purpose hardware as discussed above, as an alternate the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those of ordinary skill in the art and consequently, are not described in detail herein.

The flowcharts and methods described herein show the functionality and operation of various implementations. If embodied in software, each block or step may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processing component in a computer system. If embodied in hardware, each block may represent a circuit or a number of interconnected circuits to implement the specified logical function(s).

Although the flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

Also, any logic or application described herein that comprises software or code can be embodied in any non-transitory computer-readable medium or memory for use by or in connection with an instruction execution system such as a processing component in a computer system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as magnetic, optical, or semiconductor media. More specific examples of a suitable computer-readable media include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described example(s) without departing substantially from the spirit and principles of the disclosure. All such modifications and variations are intended to be included herein within the scope of this disclosure and protected by the following claims.

What is claimed is:

1. A computer-implemented method comprising:
   determining a first account identifier associated with a natural language processing system;
   receiving a natural language input associated with the first account identifier over a first past time period;
   generating, using a language model, first data representing the natural language input;
   receiving first audio data representing the natural language input;
   generating, using an acoustic model, second data representing the first audio data;
   determining third data representing a performance metric of the natural language processing system, the performance metric associated with predicted error during processing of the natural language input;
   generating fourth data by concatenating at least the first data, the second data, and the third data;
   generating, using an unsupervised clustering algorithm, a plurality of clusters of account identifiers, wherein a first cluster of the plurality of clusters includes the fourth data and a plurality of other data representations;
   determining an average score of the performance metric for the first cluster;
   determining that the average score of the performance metric is associated with underperformance of the natural language processing system for the natural language input;
   generating a training data set for a first machine learning model of the natural language processing system, the training data set including the fourth data and the plurality of other data representations; and
   generating updated parameters of the first machine learning model using the training data set.

2. The method of claim 1, further comprising:
   determining first metadata associated with the first account identifier, the first metadata identifying a geographical location associated with the first account identifier, wherein the fourth data is generated using the first metadata, and wherein the plurality of other data representations of the first cluster are associated with the first metadata identifying the geographical location.

3. The method of claim 1, further comprising:
   generating the plurality of clusters using a first homogeneity loss, the first homogeneity loss maximizing a first similarity of the plurality of other data representations with respect to one another; and
   generating the plurality of clusters using a second homogeneity loss, the second homogeneity loss maximizing a second similarity of performance metrics associated with the plurality of other data representations.

4. A method comprising:
   receiving a first natural language input to a natural language processing system, the first natural language input being associated with a first account identifier;
   determining, using a first machine learning model, first data representing one or more words of the first natural language input;
   determining, using a second machine learning model, second data representing one or more acoustic characteristics of the first natural language input;
   determining, based at least in part on the first data and the second data, third data representing a predicted performance for processing the first natural language input by the natural language processing system; and
   determining, based at least in part on the predicted performance, a first cluster associated with the first natural language input, wherein the first cluster comprises data representing past natural language inputs.

5. The method of claim 4, further comprising:
   determining, using an unsupervised machine learning algorithm, a plurality of clusters of account identifiers based at least in part on the first data and the second data, wherein the first cluster is among the plurality of clusters, and wherein the first account identifier is included in the first cluster of the plurality of clusters; and
   determining fourth data representing a performance level of the natural language processing system for processing natural language inputs received from account identifiers associated with the first cluster.

6. The method of claim 4, further comprising:
   determining, using an unsupervised machine learning algorithm, a plurality of clusters of account identifiers based at least in part on the first data and the second data, wherein the first cluster is among the plurality of clusters, and wherein the first account identifier is included in the first cluster of the plurality of clusters;

determining, fourth data comprising an aggregated performance level associated with the first cluster; and including account identifiers of the first cluster in a training data set based at least in part on the fourth data.

7. The method of claim 4, further comprising:

determining, based at least in part on the third data, a cohort of account identifiers associated with the predicted performance;

generating a training data set comprising feature data representing natural language inputs associated with the account identifiers of the cohort; and generating at least one updated parameter of a third machine learning model using the training data set, the third machine learning model being associated with the natural language processing system.

8. The method of claim 4, further comprising:

determining, by a neural network, the predicted performance, wherein the neural network is trained using a first training instance comprising a first feature representation of a second natural language input and label data comprising a performance score of the natural language processing system for processing the second natural language input.

9. The method of claim 4, further comprising:

determining a third data representation comprising a mel-frequency cepstral coefficient of the first natural language input; and generating a first combined feature vector associated with the first account identifier based at least in part on a concatenation of a first vector representing the first data, a second vector representing the second data, and a third vector representing the third data.

10. The method of claim 9, further comprising:

determining the first cluster comprising the first combined feature vector and a second combined feature vector, wherein the second combined feature vector is associated with a second account identifier, and wherein the first combined feature vector and the second combined feature vector are included in the first cluster based at least in part on a similarity metric used to determine a distance between the first combined feature vector and the second combined feature vector in a feature space common to both the first combined feature vector and the second combined feature vector.

11. The method of claim 4, further comprising:

determining a plurality of machine learning models effective to perform a first natural language processing task;

determining, from among the plurality of machine learning models, a third machine learning model associated with the first cluster; and selecting the third machine learning model to process the first natural language input based at least in part on the first cluster being associated with the first natural language input.

12. The method of claim 4, further comprising:

determining, using an unsupervised machine learning algorithm, a plurality of clusters of account identifiers based at least in part on the first data and the second data, wherein the first cluster is among the plurality of clusters, and wherein the first account identifier is included in the first cluster of the plurality of clusters;

determining a first error rate associated with the first cluster of the plurality of clusters;

determining a second error rate associated with a second cluster of the plurality of clusters; and including data points of the first cluster in a first training data set based at least in part on comparison of the first error rate and the second error rate, wherein the first training data set is used to train at least one of an automatic speech recognition (ASR) model or a natural language understanding (NLU) model of the natural language processing system.

13. A system comprising:

at least one processor; and non-transitory computer-readable memory storing instructions that, when executed by the at least one processor, are effective to:

receive a first natural language input to a natural language processing system, the first natural language input being associated with a first account identifier;

determine, using a first machine learning model, first data representing one or more words of the first natural language input;

determine, using a second machine learning model, second data representing one or more acoustic characteristics of the first natural language input;

determine, based at least in part on the first data and the second data, third data representing a predicted performance for processing the first natural language input by the natural language processing system; and determine, based at least in part on the predicted performance a first cluster associated with the first natural language input, wherein the first cluster comprises data representing past natural language inputs.

14. The system of claim 13, the non-transitory computer-readable memory storing further instructions that, when executed by the at least one processor, are further effective to:

determine, using an unsupervised machine learning algorithm, a plurality of clusters of account identifiers based at least in part on the first data and the second data, wherein the first cluster is among the plurality of clusters, and wherein the first account identifier is included in the first cluster of the plurality of clusters; and determine fourth data representing a performance level of the natural language processing system for processing natural language inputs received from account identifiers associated with the first cluster.

15. The system of claim 13, the non-transitory computer-readable memory storing further instructions that, when executed by the at least one processor, are further effective to:

determine, using an unsupervised machine learning algorithm, a plurality of clusters of account identifiers based at least in part on the first data and the second data, wherein the first cluster is among the plurality of clusters, and wherein the first account identifier is included in the first cluster of the plurality of clusters;

determine, fourth data comprising an aggregated performance level associated with the first cluster; and include account identifiers of the first cluster in a training data set based at least in part on the fourth data.

16. The system of claim 13, the non-transitory computer-readable memory storing further instructions that, when executed by the at least one processor, are further effective to:

determine, based at least in part on the third data, a cohort of account identifiers associated with the predicted performance;

generate a training data set comprising feature data representing natural language inputs associated with the account identifiers of the cohort; and generate at least one updated parameter of a third machine learning model using the training data set, the third machine learning model being associated with the natural language processing system.

17. The system of claim 13, the non-transitory computer-readable memory storing further instructions that, when executed by the at least one processor, are further effective to:

determine, by a neural network, the predicted performance, wherein the neural network is trained using a first training instance comprising a first feature representation of a second natural language input and label data comprising a performance score of the natural language processing system for processing the second natural language input.

18. The system of claim 13, the non-transitory computer-readable memory storing further instructions that, when executed by the at least one processor, are further effective to:

determine a third data representation comprising a mel-frequency cepstral coefficient of the first natural language input; and generate a first combined feature vector associated with the first account identifier based at least in part on a concatenation of a first vector representing the first data, a second vector representing the second data, and a third vector representing the third data.

19. The system of claim 18, the non-transitory computer-readable memory storing further instructions that, when executed by the at least one processor, are further effective to:

determine the first cluster comprising the first combined feature vector and a second combined feature vector, wherein the second combined feature vector is associated with a second account identifier, and wherein the first combined feature vector and the second combined feature vector are included in the first cluster based at least in part on a similarity metric used to determine a distance between the first combined feature vector and the second combined feature vector in a feature space common to both the first combined feature vector and the second combined feature vector.

20. The system of claim 13, the non-transitory computer-readable memory storing further instructions that, when executed by the at least one processor, are further effective to:

determine a plurality of machine learning models effective to perform a first natural language processing task;

determine, from among the plurality of machine learning models, a third machine learning model that is associated with the first cluster; and select the third machine learning model to process the first natural language input based at least in part on the first cluster being associated with the first natural language input.

* * * * *